United States Patent
Elshafie et al.

(10) Patent No.: US 11,792,803 B2
(45) Date of Patent: Oct. 17, 2023

(54) METHODS AND APPARATUS FOR UTILIZING UL SYMBOLS FOR DEFERRED SPS HARQ-ACK TRANSMISSIONS

(71) Applicant: QUALCOMM Incorporated, San Diego, CA (US)

(72) Inventors: Ahmed Elshafie, San Diego, CA (US); Yi Huang, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 17/157,910

(22) Filed: Jan. 25, 2021

(65) Prior Publication Data

US 2022/0240242 A1 Jul. 28, 2022

(51) Int. Cl.
*H04W 72/21* (2023.01)
*H04L 1/1812* (2023.01)
*H04L 5/00* (2006.01)

(52) U.S. Cl.
CPC ........... *H04W 72/21* (2023.01); *H04L 1/1812* (2013.01); *H04L 5/0044* (2013.01)

(58) Field of Classification Search
CPC . H04W 72/0413; H04L 1/1812; H04L 5/0044
See application file for complete search history.

(56) References Cited

U.S. PATENT DOCUMENTS

2018/0278454 A1* 9/2018 Islam .................... H04L 1/0038
2020/0204328 A1* 6/2020 He ........................ H04L 5/0055
2020/0374089 A1* 11/2020 Yang .................... H04L 5/0055

OTHER PUBLICATIONS

International Search Report and Written Opinion—PCT/US2022/012041—ISA/EPO—dated May 9, 2022.
Wilus Inc: "Remaining Issues on SPS PDSCH for NR URLLC", 3GPP Draft, 3GPP TSG RAN WG1 #99, R1-1913071, 3rd Generation Partnership Project (3GPP), vol. RAN WG1, No. Reno, USA, Nov. 18, 2019-Nov. 22, 2019, Nov. 9, 2019 (Nov. 9, 2019), XP051823764, 5 pages, Retrieved from the Internet: URL: https://ftp.3gpp.org/tsg_ran/WG1_RL1/TSGR1_99/Docs/R1-1913071.zip R1-1913071_SPS_final.docx [retrieved—on Nov. 9, 2019] pp. 3-4.

\* cited by examiner

*Primary Examiner* — Basil Ma
(74) *Attorney, Agent, or Firm* — Procopio, Cory, Hargreaves & Savitch LLP

(57) ABSTRACT

An apparatus is disclosed. The apparatus may determine whether one or more PUCCH resources, one or more second PUCCH resources, or one or more third PUCCH resources of a plurality of PUCCH resources are suitable for at least one uplink transmission. Each of the one or more first PUCCH resources may include a payload capacity equal to a payload threshold. Each of the one or more second PUCCH resources may include a payload capacity greater than the payload threshold. Each of the one or more third PUCCH resources may include a payload capacity less than the payload threshold. The apparatus may transmit, based on the selection of PUCCH resources, the at least one uplink transmission via the selected at least one of the one or more first PUCCH resources, the one or more second PUCCH resources, or the one or more third PUCCH resources.

30 Claims, 12 Drawing Sheets

METHODS AND APPARATUS FOR UTILIZING UL SYMBOLS FOR DEFERRED SPS HARQ-ACK TRANSMISSIONS

BACKGROUND

Technical Field

The present disclosure relates generally to communication systems, and more particularly, to transmission of deferred acknowledgments in a wireless communication system.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may determine whether one or more first physical uplink control channel (PUCCH) resources, one or more second PUCCH resources, or one or more third PUCCH resources of a plurality of PUCCH resources are suitable for at least one uplink transmission. Each of the one or more first PUCCH resources may include a payload capacity equal to a payload threshold. Each of the one or more second PUCCH resources may include a payload capacity greater than the payload threshold. Each of the one or more third PUCCH resources may include a payload capacity less than the payload threshold. The apparatus may select, upon determining that the one or more first PUCCH resources are suitable for the at least one uplink transmission, at least one of the one or more first PUCCH resources for the at least one uplink transmission. The apparatus may select, upon determining that the one or more first PUCCH resources are not suitable and the one or more second PUCCH resources are suitable for the at least one uplink transmission, at least one of the one or more second PUCCH resources for the at least one uplink transmissions. The apparatus may select, upon determining that the one or more first PUCCH resources and the one or more second PUCCH resources are not suitable and the one or more third PUCCH resources are suitable for the at least one uplink transmission, at least one of the one or more third PUCCH resources for the at least one uplink transmission. The apparatus may transmit, based on the selection of PUCCH resources, the at least one uplink transmission via the selected at least one of the one or more first PUCCH resources, the one or more second PUCCH resources, or the one or more third PUCCH resources.

In an aspect of the disclosure, a method, a computer-readable medium, and an apparatus are provided. The apparatus may be a base station. The apparatus may transmit, to a UE, an indication of a PUCCH transmission collision associated with at least one uplink transmission. The apparatus may receive, from the UE, the at least one uplink transmission via at least one of one or more first PUCCH resources, one or more second PUCCH resources, or one or more third PUCCH resources of a plurality of PUCCH resources. Each of the one or more first PUCCH resources may include a payload capacity equal to a payload threshold. Each of the one or more second PUCCH resources may include a payload capacity greater than the payload threshold. Each of the one or more third PUCCH resources may include a payload capacity less than the payload threshold. The at least one uplink transmission may be received via at least one of the one or more first PUCCH resources when the one or more first PUCCH resources are suitable for the at least one uplink transmission, via at least one of the one or more second PUCCH resources when the one or more first PUCCH resources are not suitable and the one or more second PUCCH resources are suitable for the at least one uplink transmission, or via at least one of the one or more third PUCCH resources when the one or more first PUCCH resources and the one or more second PUCCH resources are not suitable and the one or more third PUCCH resources are suitable for the at least one uplink transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
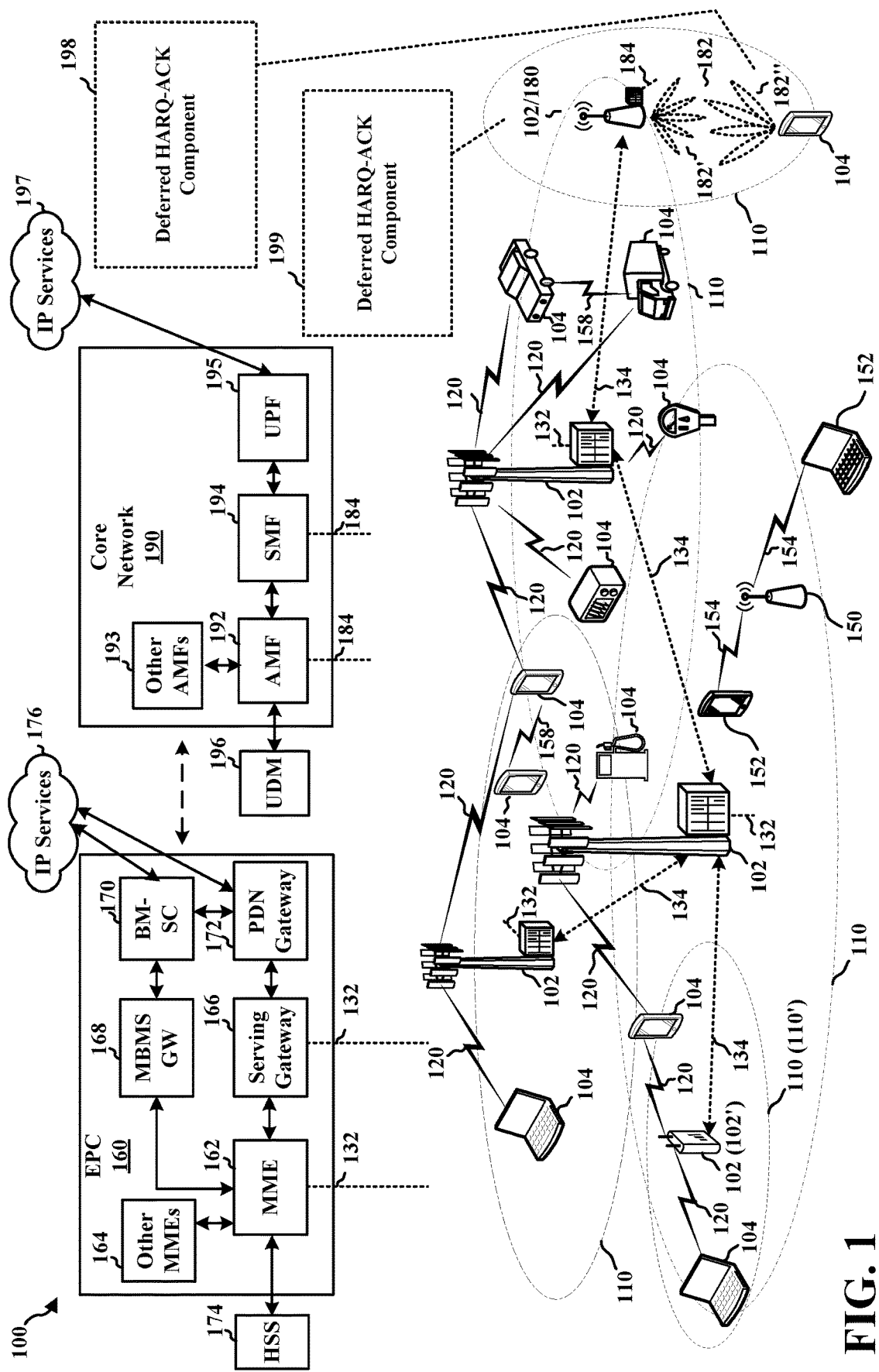
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a deferred hybrid automatic repeat request (HARQ)-acknowledgment (ACK) component 198 that may be configured to determine whether one or more first physical uplink control channel (PUCCH) resources, one or more second PUCCH resources, or one or more third PUCCH resources of a plurality of PUCCH resources are suitable for at least one uplink transmission. Each of the one or more first PUCCH resources may include a payload capacity equal to a payload threshold. Each of the one or more second PUCCH resources may include a payload capacity greater than the payload threshold. Each of the one or more third PUCCH resources may include a payload capacity less than the payload threshold. The deferred HARQ-ACK component 198 may be configured to select, upon determining that the one or more first PUCCH resources are suitable for the at least one uplink transmission, at least one of the one or more first PUCCH resources for the at least one uplink transmission. The deferred HARQ-ACK component 198 may be configured to select, upon determining that the one or more first PUCCH resources are not suitable and the one or more second PUCCH resources are suitable for the at least one uplink transmission, at least one of the one or more second PUCCH resources for the at least one uplink transmissions. The deferred HARQ-ACK component 198 may be configured to select, upon determining that the one or more first PUCCH resources and the one or more second PUCCH resources are not suitable and the one or more third PUCCH resources are suitable for the at least one uplink transmission, at least one of the one or more third PUCCH resources for the at least one uplink transmission. The deferred HARQ-ACK component 198 may be configured to transmit, based on the selection of PUCCH resources, the at least one uplink transmission via the selected at least one of the one or more first PUCCH resources, the one or more second PUCCH resources, or the one or more third PUCCH resources.

In certain aspects, the base station 180 may include a deferred HARQ-ACK component 199 that may be configured to transmit, to a UE, an indication of a PUCCH transmission collision associated with at least one uplink transmission. The deferred HARQ-ACK component 199 may be configured to receive, from the UE, the at least one uplink transmission via at least one of one or more first PUCCH resources, one or more second PUCCH resources, or one or more third PUCCH resources of a plurality of PUCCH resources. Each of the one or more first PUCCH resources may include a payload capacity equal to a payload threshold. Each of the one or more second PUCCH resources may include a payload capacity greater than the payload threshold. Each of the one or more third PUCCH resources may include a payload capacity less than the payload threshold. The at least one uplink transmission may be received via at least one of the one or more first PUCCH resources when the one or more first PUCCH resources are suitable for the at least one uplink transmission, via at least one of the one or more second PUCCH resources when the one or more first PUCCH resources are not suitable and the one or more second PUCCH resources are suitable for the at least one uplink transmission, or via at least one of the one or more third PUCCH resources when the one or more first PUCCH resources and the one or more second PUCCH resources are not suitable and the one or more third PUCCH resources are suitable for the at least one uplink transmission.

Although the following description may be focused on 5G NR, the concepts described herein may be applicable to other similar areas, such as LTE, LTE-A, CDMA, GSM, and other wireless technologies.

Figure 2:
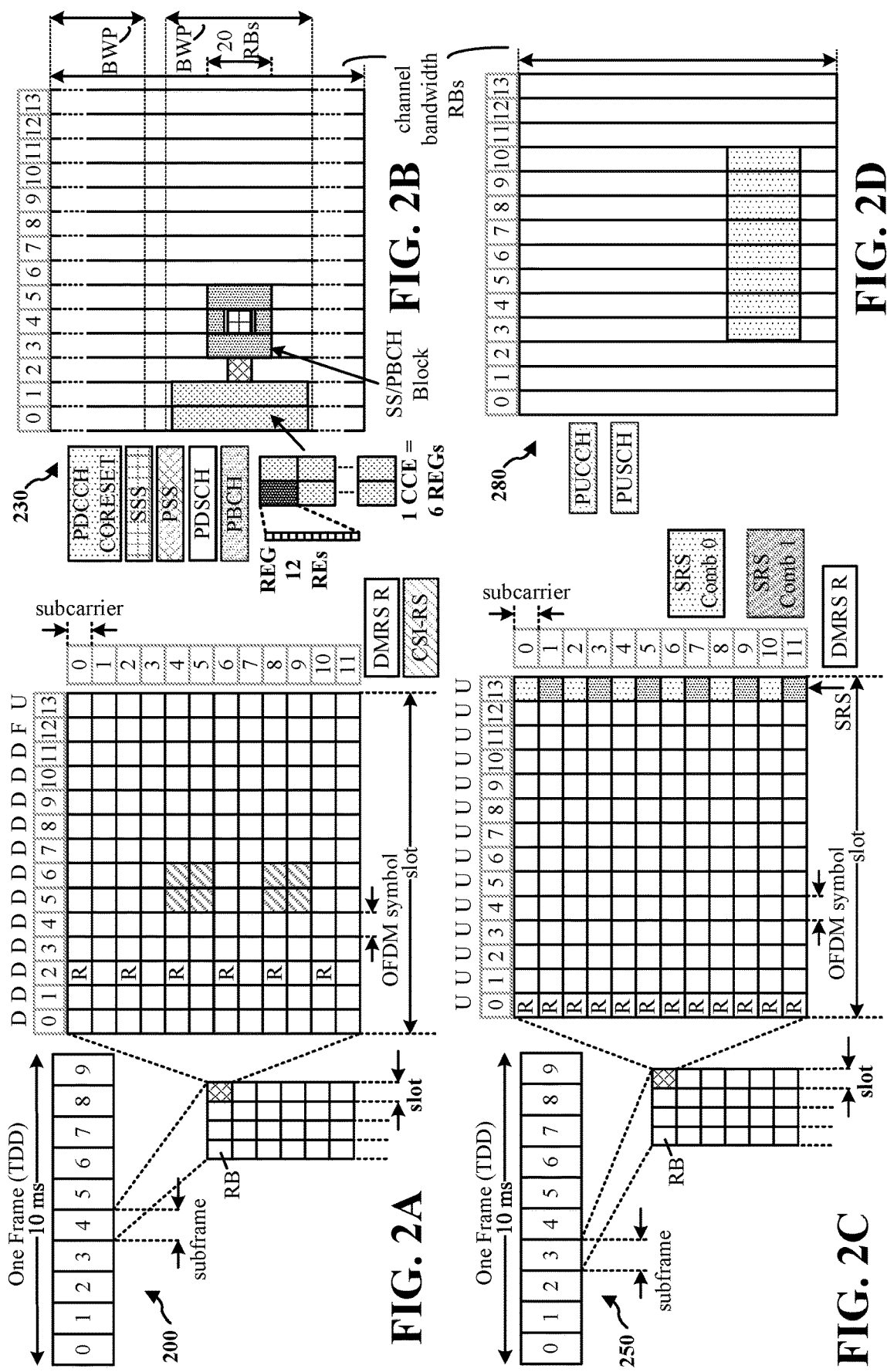
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
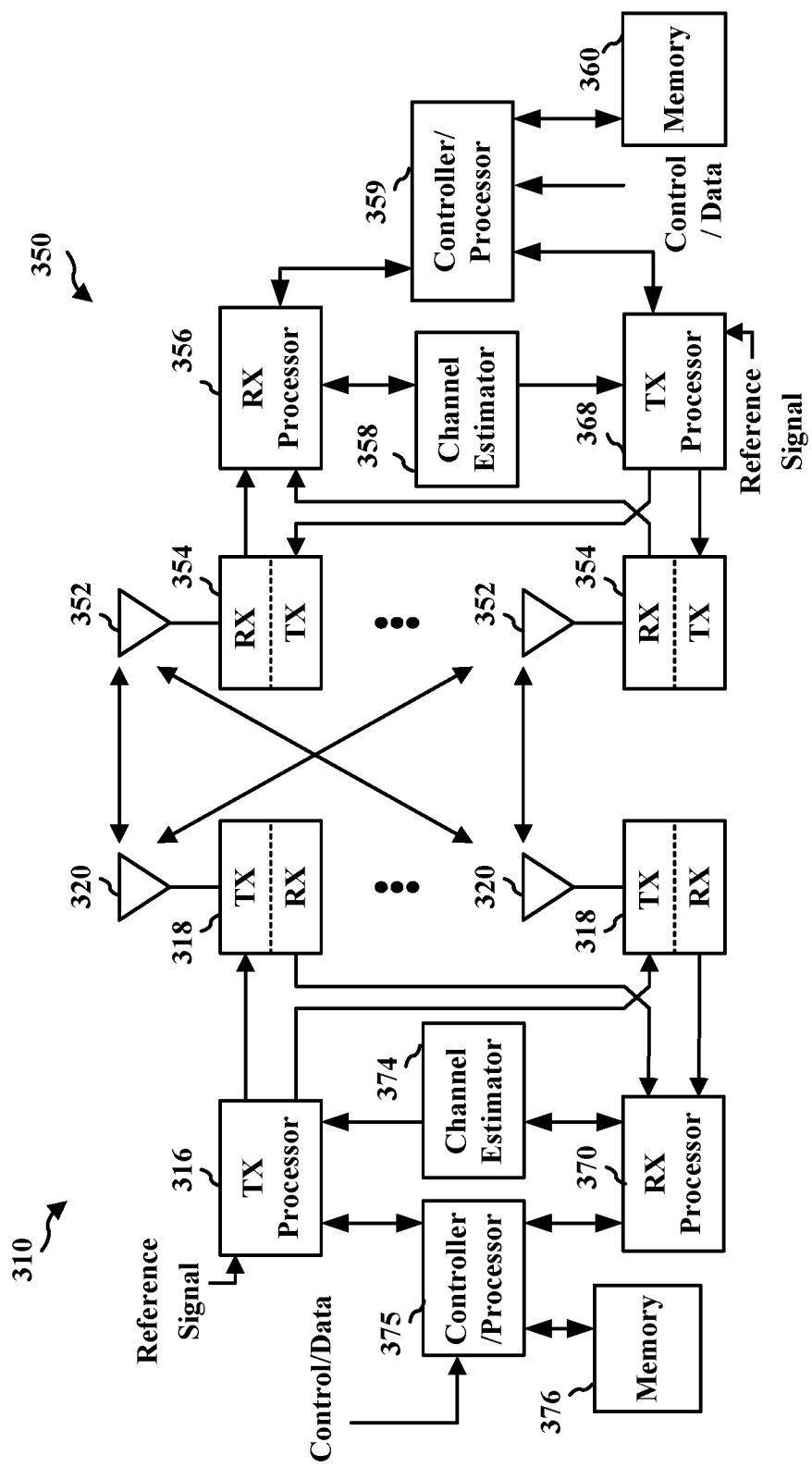
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

Figure 4:
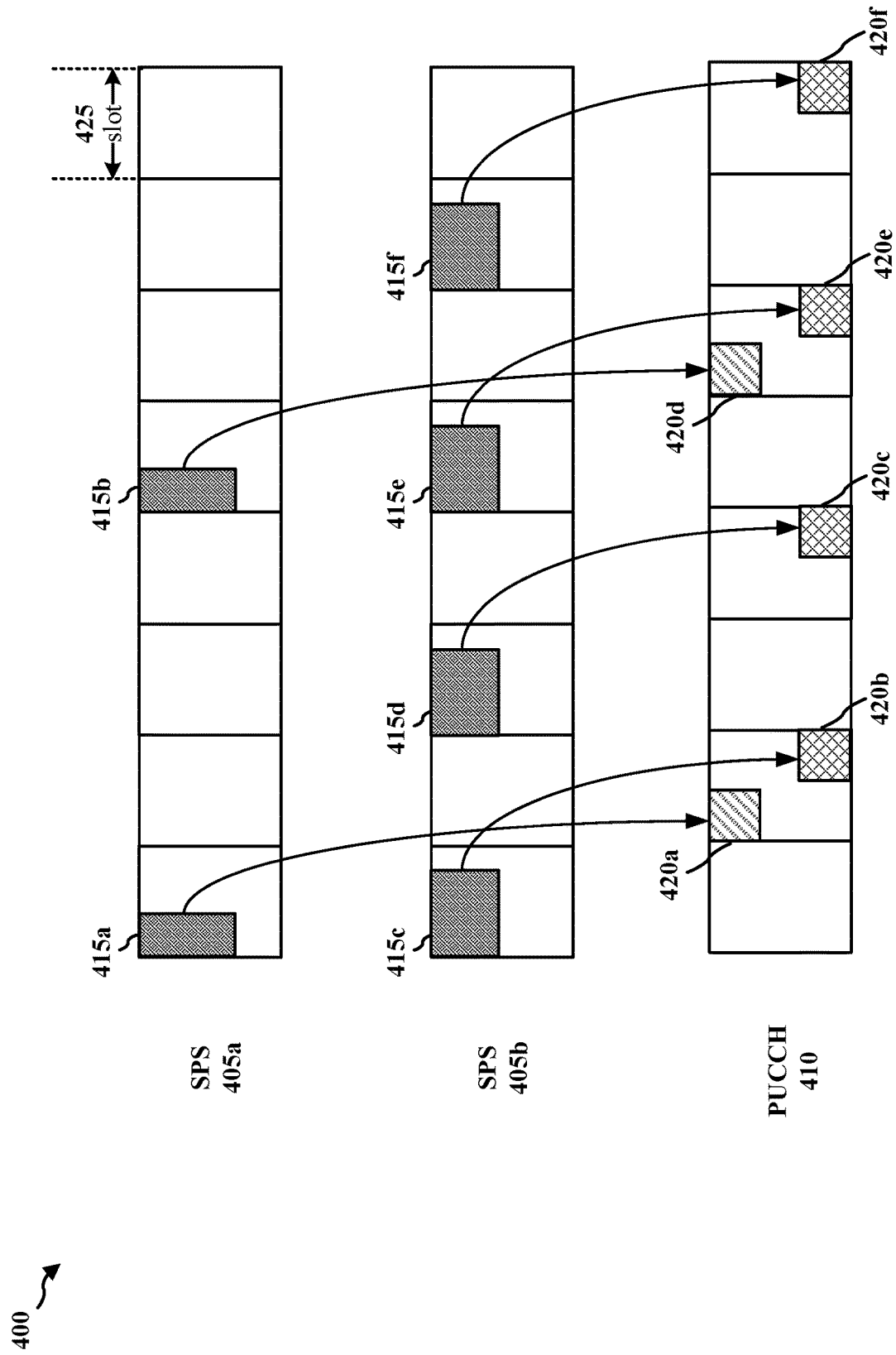
FIG. 4 illustrates an example of a wireless communications system that supports ACK feedback for multiple active downlink semi-persistent scheduling (SPS) configurations.

FIG. 4 illustrates an example of a wireless communications system 400 that supports ACK feedback for multiple active downlink SPS configurations. In some examples, wireless communications system 400 may implement aspects of wireless communications system 100. Wireless communication system 400 may include a base station 102/180 and a UE 104, which may be examples of corresponding base stations 102/180 and UEs 104, respectively, as described above with reference to FIG. 1. In some cases, UE 104 and base station 102/180 may communicate via resources of different carriers (e.g., and/or component carriers) for uplink and/or downlink transmissions.

As described herein, UE 104 may support multiple configurations for respective downlink SPSs 405, e.g., first SPS 405a and second SPS 405b, to receive downlink messages from base station 102/180 and support a single PUCCH 410 (e.g., PUCCH carrier) to transmit uplink messages to base station 102/180 based on the messages received according to the SPSs 405. For example, UE 104 may receive the downlink messages on PDSCHs 415 that occur at regular intervals (e.g., in numbers of slots 425) in each SPS 405. As shown and as an illustrative example, base station 102/180 may configure a first SPS 405a with PDSCHs 415 that occur every fourth slot 425 and a second SPS 405b with PDSCHs 415 that occur every second slot 425. While slots 425 are shown for each SPS 405, it is to be understood that the SPSs 405 may include periodicities that occur at different length intervals (e.g., other TTIs, mini-slots, etc.).

In some cases, base station 102/180 may transmit a separate configuration (e.g., grant) for each SPS 405 (e.g., via RRC signaling). The configuration for each SPS 405 may include a periodicity for the downlink SPS 405 (e.g., an SPS downlink interval). For example, the periodicity may be 2 OFDM symbols, 7 OFDM symbols, one slot, 2 slots, 4 slots, 5 slots, 8 slots, 10 slots, 16 slots, 20 slots, 32 slots, 40 slots, 64 slots, 80 slots, 128 slots, 160 slots, 320 slots, 640 slots, etc. Additionally, the SPS configurations may indicate a number of configured processes (e.g., HARQ processes) for the SPS 405 (e.g., downlink SPS). In some cases, the number of configured processes may range from one to eight. In some cases, the SPS configurations may include resource(s) (e.g., HARQ resources) for PUCCH 410 for transmitting ACK messages (e.g., an ACK 420) for PDSCHs 415 in the corresponding SPS 405. Accordingly, base station 102/180 (e.g., the network) may configure the resource(s) for PUCCH 410 in different formats (e.g., as format0, format1, etc.).

Accordingly, base station 102/180 may configure PUCCH 410 to carry ACKs 420 (e.g., HARQ ACK feedback messages, ACK feedback messages, ACK feedbacks, etc.) that UE 104 transmits for the PDSCHs 415. For example, UE 104 may transmit ACKs 420 to indicate whether a corresponding PDSCH 415 was received and decoded successfully (e.g., an ACK if successfully received and decoded or a NACK if unsuccessfully received or decoded). In some cases, base station 102/180 may configure UE 104 to transmit an ACK 420 in a next occurring slot that a PDSCH 415 is transmitted to UE 104. Additionally or alternatively, base station 102/180 may configure UE 104 to transmit an ACK 420 a number of slots (e.g., K1 slots) after a PDSCH 415 is transmitted to UE 104. Accordingly, this number of slots may be an integer signaled in a DCI message that activates the SPS 405 for the PDSCH 415 transmissions.

For example, for first SPS 405a, UE 104 may receive PDSCH 415a in a first slot 425 and PDSCH 415b in a fifth slot 425 and be configured to transmit ACK 420a in a second slot 425 occurring sequentially after the first slot 425 and ACK 420d in a sixth slot 425 occurring sequentially after fifth slot 425. Additionally, for second SPS 405b, UE 104 may receive PDSCH 415c, PDSCH 415d, PDSCH 415e, and PDSCH 415f in the first slot 425, a third slot 425, the fifth slot 425, and a seventh slot 425, respectively. Accordingly, base station 102/180 may configure UE 104 to transmit ACK 420b in the second slot 425 for PDSCH 415c (e.g., sequentially occurring after the first slot 425), ACK 420c in a fourth slot 425 for PDSCH 415d (e.g., sequentially occurring after the third slot 425), ACK 420e in the sixth slot 425 for PDSCH 415e (e.g., sequentially occurring after the fifth slot 425), and ACK 420f in an eighth slot 425 for PDSCH 415f (e.g., sequentially occurring after the seventh slot 425). Additionally or alternatively, although not shown, ACKs 420 may occur in any subsequent slot 425 (e.g., or TTI according to an integer K1) after a PDSCH 415 is transmitted by base station 102/180 (e.g., not just a next occurring slot).

However, as can be seen, base station 102/180 may configure UE 104 to transmit more than one ACK 420 for multiple PDSCHs 415 in one or more slots 425 of PUCCH 410. For example, PDSCH 415a of first SPS 405a and PDSCH 415c of second SPS 405b may include ACK 420a and ACK 420b, respectively, in the second slot 425, and/or PDSCH 415b of first SPS 405a and PDSCH 415e of second SPS 405b may include ACK 420d and ACK 420e, respectively, in the sixth slot 425 of PUCCH 410. In some cases, UE 104 may combine (e.g., multiplex) the ACKs 420 into a single ACK feedback message.

As described herein, base station 102/180 may configure one or more resources for PUCCH 410 (e.g., a PUCCH configuration) within a slot 425 (e.g., uplink slot) for a multiple downlink SPS ACK feedback (e.g., multi-DL-SPS-AN feedback). For example, each resource for PUCCH 410 may correspond to a given payload size or number of ACK information bits to be transmitted for the multiple ACKs 420 (e.g., one ACK information bit per ACK 420 for a corresponding received PDSCH 415). In some cases, UE 104 may determine which resource for PUCCH 410 (e.g., PUCCH resource) to use based on comparing the number of ACK information bits to transmit against a threshold value (e.g., a maximum payload size, such as two bits). Accordingly, if the number of ACK information bits is less than or equal to the threshold value (e.g., less than or equal to two bits), UE 104 may use a first PUCCH resource (e.g., PUCCH resource 0) for transmitting the corresponding ACKs 420. Alternatively, if the number of ACK information bits is greater than the threshold value (e.g., greater than two bits), UE 104 may use a second PUCCH resource (e.g., PUCCH resource 1) for transmitting the corresponding ACKs 420.

Base station 102/180 may transmit the indication of the PUCCH resources and the threshold value in a separate configuration message (e.g., grant) for transmitting multiple SPS ACK feedbacks than the configurations for each SPS 405. Accordingly, each downlink configuration for each SPS 405 may still indicate a resource for PUCCH 410 (e.g., a PUCCH resource) to transmit an ACK 420 for the given SPS 405. As such, if one PDSCH 415 is received within a slot 425, UE 104 may use the PUCCH resource configured for the corresponding SPS 405 to transmit the ACK 420 for the one PDSCH 415 received. Additionally or alternatively, if multiple PDSCHs 415 are received within a slot 425, then UE 104 may determine a PUCCH resource to use for transmitting the corresponding ACKs 420 based on the separate configuration message and the number of ACK information bits to be transmitted (e.g., a number of ACKs to transmit). In some cases, UE 104 may multiplex the multiple ACKs 420 into a single ACK feedback message (e.g., based on different codebooks). Additionally, a downlink SPS opportunity (e.g., to receive a corresponding PDSCH 415) may be cancelled and/or an ACK 420 may be delayed until a next available slot 425 based on symbols originally allocated for either transmission being unavailable for the corresponding transmission.

The above described techniques with reference to FIG. 4 may be performed on TTIs with a different length than the illustrated slots 425. For example, the downlink SPSs 405 may include a periodicity less than a slot (e.g., a sub-slot, mini-slot, or similar shorter TTI length instead of a slot 425). Accordingly, each slot 425 as shown in FIG. 4 may represent a sub-slot or mini-slot (e.g., or similar shorter TTI length) rather than a slot length duration, and the ACKs 420 (e.g., ACK/NACK feedback), PUCCH resource determination for transmitting the ACKs 420 on PUCCH 410, and counting of the number of ACK information bits (e.g., ACK/NACK information bits) for each ACK 420 may be performed for each sub-slot or mini-slot.

Figure 5:
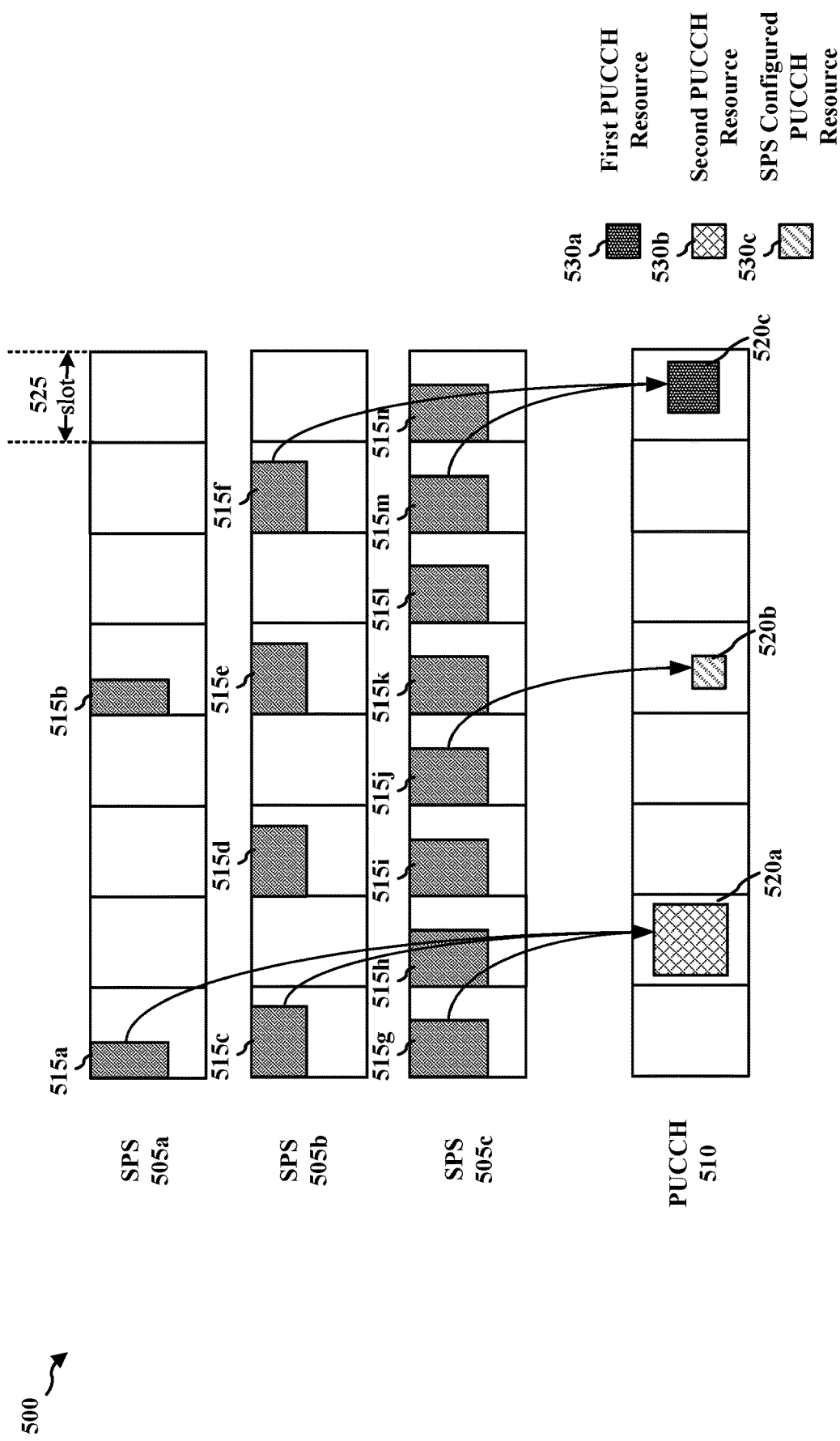
FIG. 5 illustrates an example of an ACK feedback configuration that supports ACK feedback for multiple active downlink SPS configurations.

FIG. 5 illustrates an example of an ACK feedback configuration 500 that supports ACK feedback for multiple active downlink SPS configurations. In some examples, ACK feedback configuration 500 may implement aspects of wireless communications systems 100 and/or 400. In some cases, a UE 104 may support multiple SPSs 305 for receiving downlink messages from a base station 102/180, where each SPS 305 includes periodic opportunities for receiving PDSCHs 315 from the base station 102/180 at regular intervals in the SPS 305. Additionally, the base station 102/180 may configure the UE 104 to transmit ACKs 320 on a PUCCH 510 for the corresponding PDSCHs 315. Accordingly, UE 104 may use ACK feedback configuration 500 to determine which resources to use for transmitting the ACKs 320 on PUCCH 510 if multiple PDSCHs 315 are received within a same slot 525.

As shown in FIG. 5, the base station 102/180 may configure the UE 104 with three SPSs 505, each with different periodicities for receiving PDSCHs 515. For example, for a first SPS 505a, the UE 104 may receive a PDSCH 515a in a first slot 525 and a PDSCH 515b in a fifth slot 525. Additionally, for a second SPS 505b, the UE 104 may receive a PDSCH 515c, PDSCH 515d, PDSCH 515e, and PDSCH 515f in the first slot 525, a third slot 525, the fifth slot 525, and a seventh slot 525, respectively. For a third SPS 505c, the UE 104 may receive a PDSCH 515g, PDSCH 515h, PDSCH 515i, PDSCH 515j, PDSCH 515k, PDSCH 515l, PDSCH 515m, and PDSCH 515n in each slot 525. Additionally, the base station 102/180 may configure the UE 104 to transmit an ACK 520 on PUCCH 510 for the received PDSCHs 515 (e.g., to indicate whether the PDSCHs 515 are received and decoded correctly) on resources indicated in PUCCH 510 for each SPS 505.

However, as described herein, multiple PDSCHs 515 may be received within a same slot 525, which may affect how the UE 104 prepares the ACK 520. For example, an ACK 520a may include ACKs for PDSCH 515a of first SPS 505a, PDSCH 515c of second SPS 505b, and PDSCH 515g of third SPS 505c. Additionally, an ACK 520c may include ACKs for PDSCH 515f of second SPS 505b and for PDSCH 515n of third SPS 505c. In some slots 525, an ACK 520 may include an ACK for one PDSCH 515. For example, an ACK 520b may include an ACK for PDSCH 515j of third SPS 505c.

To accommodate the multiple PDSCHs 515 received within a slot 525, the base station 102/180 may configure (e.g., via a PUCCH configuration) one or more PUCCH resources 530 (e.g., resources on PUCCH 510) within a slot 525 for the multiple received PDSCHs 515 for multiple SPSs 505 to transmit corresponding ACKs 520 (e.g., multiple downlink SPS ACK feedback). Each PUCCH resource may correspond to a number of ACK information bits to be transmitted (e.g., a given payload size). For example, a first PUCCH resource 530a (e.g., PUCCH resource 0) may be used for less than or equal to two ACK information bits (e.g., bits of feedback for an ACK 520), and a second PUCCH resource 530b (e.g., PUCCH resource 1) may be used for more than two ACK information bits (e.g., bits of feedback). In some cases, the different PUCCH resources 530 may be based on different PUCCH formats (e.g., format0 or format1) used for transmitting less than or equal to two ACK information bits and greater than two ACK information bits (e.g., payload bits, maximum payload size, etc.). This information of the different PUCCH formats for the different number of ACK information bits may be included as part of the PUCCH configuration for the multiple downlink SPS ACK feedback. Each SPS 505 (e.g., downlink SPS configuration) may still indicate one PUCCH resource 530 for the given SPS (e.g., SPS configured PUCCH resource 530c). In some cases, SPS configured PUCCH resource 530c for each SPS 505 (e.g., for SPS 505c as shown in FIG. 5) may be absent, and the UE 104 may use the PUCCH resource configuration for the multiple downlink SPS ACK feedback to determine a PUCCH resource 530 to transmit the ACK 520 (e.g., ACK feedback).

In a given slot 525, the UE 104 may determine how many ACKs 520 (e.g., HARQ ACK information bits) to generate for the SPSs 505. If one ACK 520 is to be generated, then the UE 104 may use a PUCCH resource 530 configured in the corresponding SPS 505 configuration to transmit an ACK 520 (e.g., SPS configured PUCCH resource 530c). For example, in the fifth slot 525, the UE 104 may transmit an ACK feedback message for PDSCH 515j of third SPS 505c and, therefore, may transmit ACK 520b based on the configuration for third SPS 505c using SPS configured PUCCH resource 530c. Additionally or alternatively, the base station 102/180 may not configure a PUCCH resource for each SPS 505. Accordingly, each SPS 505 may use a same one or more PUCCH resources as configured for the multiple downlink SPS ACK feedbacks. That is, if one PDSCH 515 transmission is present for a particular ACK feedback occasion for all of the configured SPSs 505, the UE 104 may still use the one or more PUCCH resources configured for the multiple downlink SPS ACK feedbacks (e.g., first PUCCH resource 530a, second PUCCH resource 530b, etc.).

If more than one ACK 520 is to be generated, the UE 104 may first determine the payload size (e.g., the number of ACK information bits) and then select a PUCCH resource from the configured one or more PUCCH resources in the multiple downlink SPS ACK feedback configuration. For example, if two ACK information bits are utilized, the UE 104 may use first PUCCH resource 530a (e.g., PUCCH resource 0). As shown in FIG. 5, ACK 520c in eighth slot 525 may include two ACK information bits for PDSCH 515f of second SPS 505b and PDSCH 515m of third SPS 505c, and, as such, the UE 104 may use first PUCCH resource 530a to transmit ACK 520c. If more than two ACK information bits are utilized, then the UE 104 may use second PUCCH resource 530b (e.g., PUCCH resource 1). For example, as shown, ACK 520a may include three bits for PDSCH 515a of first SPS 505a, PDSCH 515c of second SPS 505b, and PDSCH 515g of third SPS 505c, and, as such, the UE 104 may use second PUCCH resource 530b to transmit ACK 520a.

In some cases, the UE 104 may use an ACK multiplexing to transmit the ACK 520 (e.g., if the UE 104 reports more than one ACK information bit in PUCCH 510 for the ACK 520). Accordingly, the UE 104 may determine the order of the ACK information bits in an ACK codebook for the ACK multiplexing based on different parameters associated with the SPSs 505. For example, the UE 104 may determine the order based on a component carrier index (e.g., from low to high) of the corresponding SPSs 505. In some cases, the UE 104 may use the component carrier indexes if one SPS 505 is activated per component carrier. Additionally or alternatively, the UE 104 may determine the order of ACK information bits based on SPS indexes (from low to high) for each SPS 505 (e.g., in case more than one SPS 505 is active per component carrier). In other cases, the UE 104 may determine the order of the ACK information bits based on a starting symbol (e.g., OFDM symbol) of the corresponding PDSCHs 515 (e.g., SPS transmissions) from earlier to later or an ending symbol of the corresponding PDSCHSs 515. Accordingly, the UE 104 may base the order on which starting or ending symbol occurs earliest to the last received symbol. Additionally or alternatively, the UE 104 may base the ordering of the ACK information bits (e.g., SPS ACK/NACK bits) on a time at which the SPSs 505 are activated. For example, if first SPS 505a is activated at slot A (e.g., the second slot 525) and second SPS 505b is activated at slot B (e.g., the first slot 525) such that A>B (e.g., SPS 505a is activated after SPS 505b), then the UE 104 may put an ACK information bit for a PDSCH 515 for first SPS 505a after an ACK information bit for second SPS 505b.

The above described techniques with reference to FIG. 5 may be performed on TTIs with a different length than the illustrated slots 525. For example, the downlink SPSs 505 may include a periodicity less than a slot (e.g., a sub-slot, mini-slot, or similar shorter TTI length instead of a slot 525). Accordingly, each slot 525 as shown in FIG. 5 may represent a sub-slot or mini-slot (e.g., or similar shorter TTI length) rather than a slot length duration, and the ACKs 520 (e.g., ACK/NACK feedback), PUCCH resource determination for transmitting the ACKs 520 on PUCCH 510, and a counting of the number of ACK information bits (e.g., ACK/NACK information bits) for each ACK 520 may be performed for each sub-slot or mini-slot.

Figure 6:
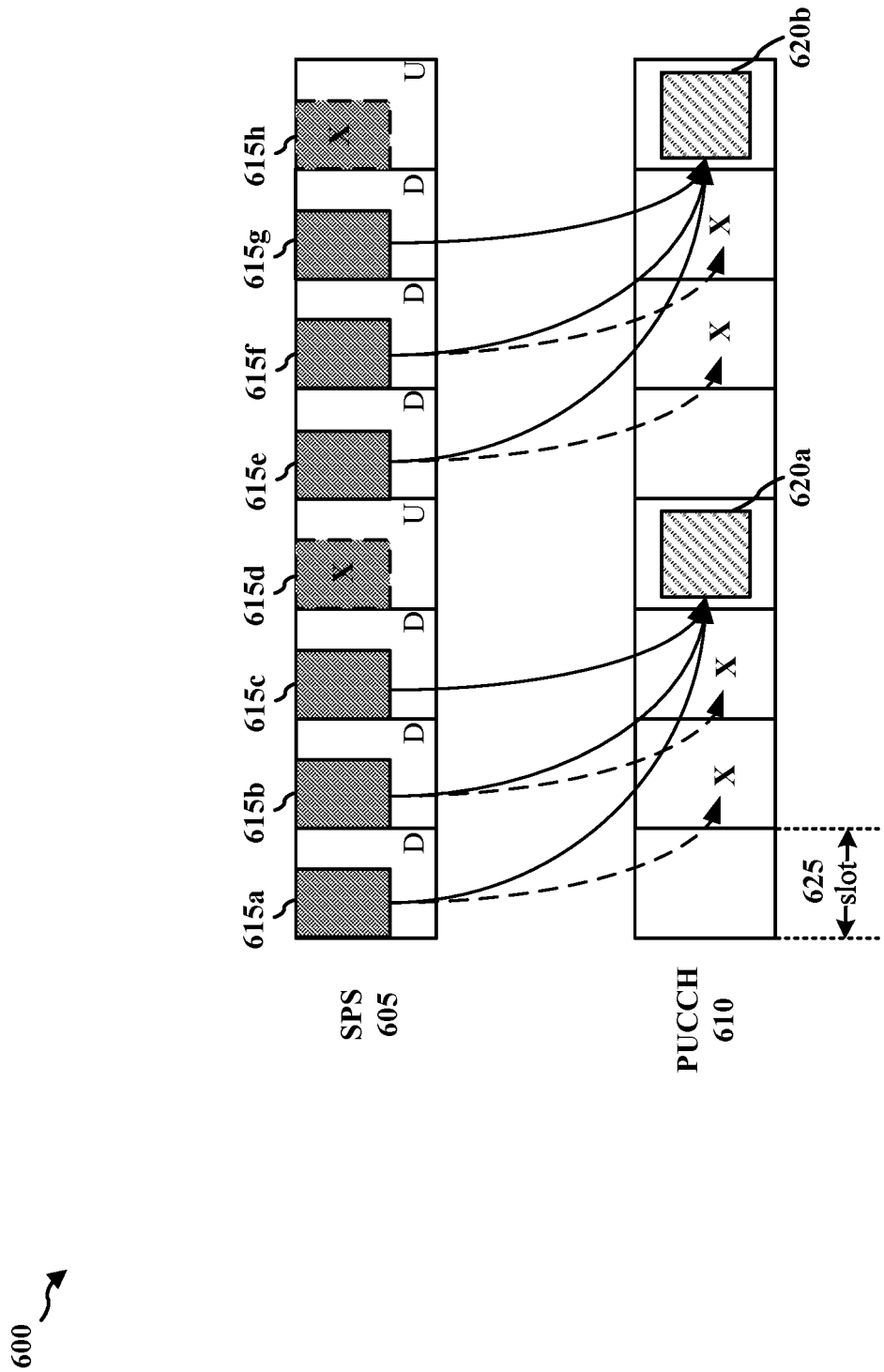
FIG. 6 illustrates an example of an ACK feedback delay configuration that supports ACK feedback for multiple active downlink SPS configurations.

FIG. 6 illustrates an example of an ACK feedback delay configuration 600 that supports ACK feedback for multiple active downlink SPS configurations. In some examples, ACK feedback delay configuration 600 may implement aspects of wireless communications systems 100 and/or 400. As described herein, a base station 102/180 may configure a UE 104 with an SPS 605 to receive one or more PDSCHs 615 transmitted at regular intervals, as well as with a PUCCH 610 to transmit ACKs 620 for the received PDSCHs 615. As shown, SPS 605 may include a PDSCH 615 that is transmitted in each slot 625.

In some cases, a given SPS opportunity for the base station 102/180 to transmit a PDSCH 615 in a slot 625 according to SPS 605 may be cancelled. For example, a TDD configuration of a slot 625 in SPS 605 may prevent the base station 102/180 from transmitting a PDSCH 615 or prevent the UE 104 from receiving the PDSCH 615. For example, at least one symbol of the transmission occasion may be indicated as flexible (e.g., downlink or uplink) or uplink by an SFI, cancelling the PDSCH 615. Additionally or alternatively, the UE 104 may be dynamically scheduled to transmit an uplink signal in at least one symbol initially configured for receiving a PDSCH 615, thereby preventing the UE 104 from receiving the PDSCH 615. In some cases, a dynamically scheduled PDSCH (e.g., transmitted via a DCI message) may occur on overlapping symbols of one or more of the configured PDSCHs 615 for the SPS 605. Accordingly, the UE 104 may also cancel an ACK 620 transmission for this SPS occasion (e.g., no HARQ-ACK information is generated by the UE 104). For example, a PDSCH 615d in a fourth slot 625 and/or a PDSCH 615h in an eighth slot 625 may be cancelled (e.g., the base station 102/180 refrains from transmitting the PDSCH 615 or the UE 104 refrains from receiving and decoding the PDSCH 615) of the SPS 605. As shown, the base station 102/180 may configure the UE 104 with a TDD configuration that includes a "DDDUDDDU" configuration of slots 625, where D represents a downlink slot, and U represents an uplink slot. Accordingly, the fourth and eighth slots 625 may be uplink slots, and, hence, PDSCHs 615d and 615h may be cancelled based on the UE 104 being configured for uplink in the corresponding slots 625 (e.g., along with cancelling the corresponding ACK feedback).

Additionally or alternatively, in a TDD system, after determining an ACK codebook as described above with reference to FIG. 5, the UE 104 may determine that a corresponding PUCCH resource cannot be transmitted. For example, the UE 104 may identify a TDD restriction (e.g., some symbols cannot be used to transmit an uplink signal) to prevent the UE 104 from transmitting an ACK 620 in a configured slot 625 for a received PDSCH 615 in the SPS 605. As shown, the base station 102/180 may configure the UE 104 with a TDD configuration that includes a "DDDUDDDU" configuration of slots 625, where D represents a downlink slot, and U represents an uplink slot, as described above. Therefore, the second and third slots 625 as shown in FIG. 6 may be downlink slots and cannot be used to transmit the ACK feedback (e.g., ACKs 620) for a PDSCHs 615a and 615b, respectively. Similarly, the sixth and seventh slot 625 as shown in FIG. 6 may also be downlink slots and cannot be used to transmit ACK feedback (e.g., ACKs 620) for PDSCHs 615e and 615f, respectively.

Accordingly, the ACK 620 may be delayed to a next available slot 625. In this next available slot 625, the UE 104 may multiplex the delayed ACK(s) 620 with an ACK 620 originally configured and scheduled to be transmitted in this slot 625. For example, an ACK 620 for a PDSCH 615a and an ACK 620 for a PDSCH 615b may not be transmitted by the UE 104 due to a conflict or restriction. Accordingly, the UE 104 may then multiplex the cancelled ACKs 620 for PDSCHs 615a and 615b with an ACK 620 for a PDSCH 615c originally scheduled for a fourth slot 625 and transmit a combined ACK 620a for PDSCH 615a, PDSCH 615b, and PDSCH 615c. The UE 104 may follow the same process for transmitting a combined ACK 620b for a PDSCH 615e and PDSCH 615f that have cancelled ACKs 620 and for a PDSCH 615g originally scheduled with an ACK 620 in the eighth slot 625.

Accordingly, the UE 104 may determine a PUCCH resource for transmitting the multiplexed codebook using techniques as described above with reference to FIG. 5. For example, the UE 104 first determine a payload size for an ACK 620 (e.g., a number of ACK information bits, a total payload size, etc.) and then determine the PUCCH resource from a configuration for a multiple downlink SPS ACK feedback based on the payload size. For example, as described above with reference to FIG. 5, a first PUCCH resource 530a and a second PUCCH resource 530b may be configured for transmitting ACK feedback based on the number of ACK information bits to be transmitted. As shown, since the ACKs 620 include ACK information bits for three PDSCHs 615, the UE 104 may determine to use the second PUCCH resource 530b based on the number of ACK information bits exceeding two bits. In some cases, the base station 102/180 may, in addition, configure a number that indicates a maximum number of slots 625 that an ACK 620 can be delayed. Accordingly, if the ACK 620 (e.g., HARQ-ACK feedback) is delayed more than this number of slots 625, then the UE 104 may discard the corresponding ACK 620. This number of slots limitation may be a mechanism to limit the number of bits on each transmission on PUCCH 610. In some cases, the base station 102/180 may include this number of slots limitation in the configuration for the multiple downlink SPS ACK feedback.

The above described techniques with reference to FIG. 6 may be performed on TTIs with a different length than the illustrated slots 625. For example, the downlink SPSs 605 may include a periodicity less than a slot (e.g., a sub-slot, mini-slot, or similar shorter TTI length instead of a slot 625). Accordingly, each slot 625 as shown in FIG. 6 may represent a sub-slot or mini-slot (e.g., or similar shorter TTI length) rather than a slot length duration, and the ACKs 620 (e.g., ACK/NACK feedback), PUCCH resource determination for transmitting the ACKs 620 on PUCCH 610, and counting of the number of ACK information bits (e.g., ACK/NACK information bits) for each ACK 620 may be performed for each sub-slot or mini-slot.

As described above, in a TDD configuration, if a slot scheduled for reporting the HARQ-ACK for the SPS is a downlink slot or overlaps with at least one downlink symbol, the UE may not transmit the HARQ-ACK report. This may result in a waste of system resources, since the base station may retransmit the SPS PDSCH due to the missed HARQ-ACK report.

A downlink slot (or sub-slot) or symbol may be semi-statically configured to be downlink, or may be converted to downlink or flexible (dynamic) from flexible (semi-static) by a dynamic SFI or dynamic DCI (e.g., a downlink grant scheduling a PDSCH, or a grant scheduling aperiodic CSI-RS transmissions). A flexible (semi-static) slot (or sub-slot) or symbol may be converted to uplink, downlink, or flexible (dynamic) through an SFI or DCI.

A HARQ-ACK feedback for an SPS PDSCH that conflicts with a downlink slot or symbol may be delayed, and may be transmitted at later uplink slots (or sub-slots) or symbols. In one aspect, the HARQ-ACK feedback may be deferred until the next (e.g., the first) available PUCCH. It may be beneficial to provide techniques for finding the first available uplink slot, which may not be straightforward when the uplink symbols may not match the configured PUCCH resources.

Figure 7:
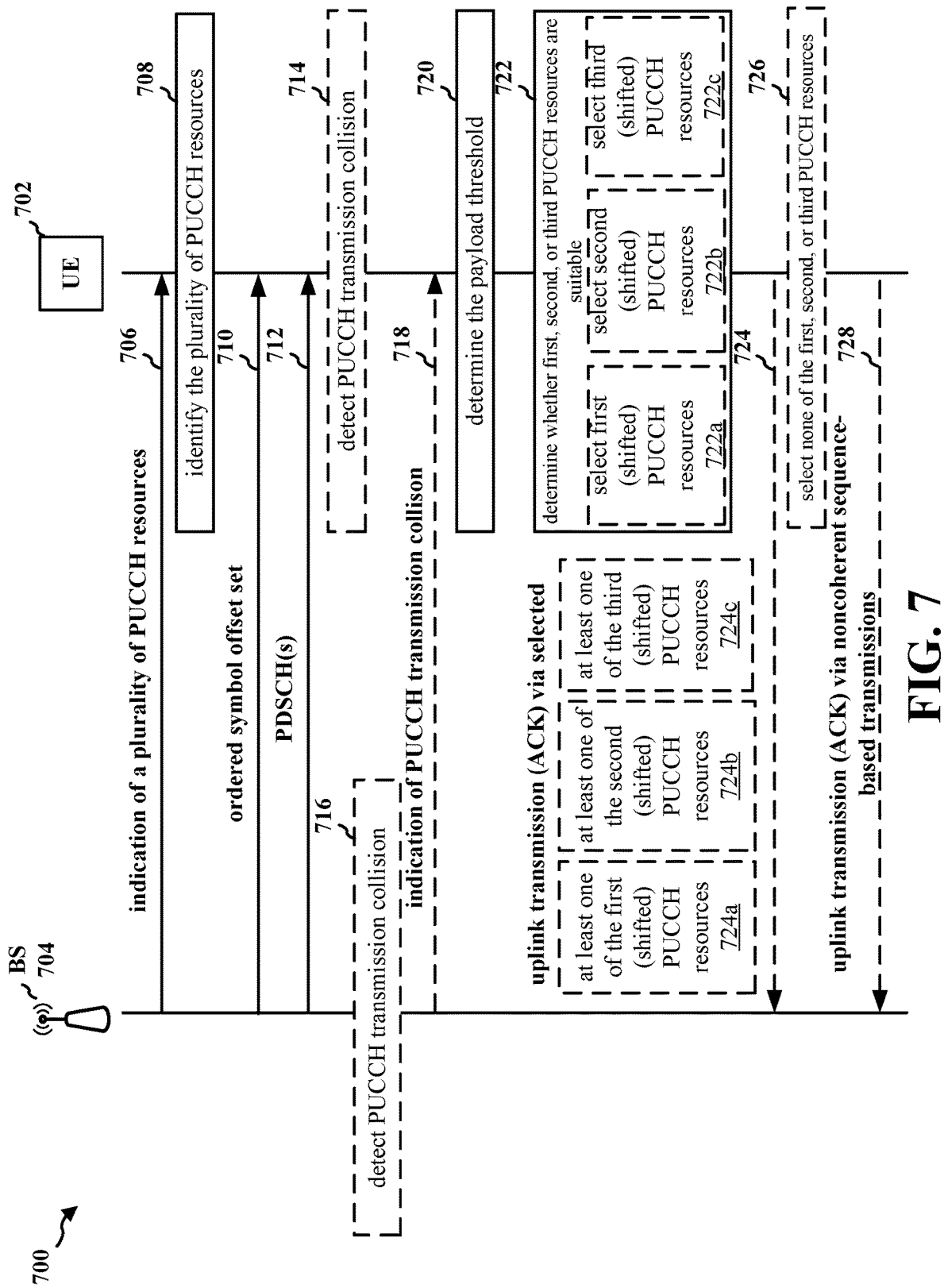
FIG. 7 is a diagram illustrating an example communication flow according to aspects.

FIG. 7 is a diagram illustrating an example communication flow 700 according to aspects. The UE 702 and the base station 704 may correspond to the UE 104 and the base station 102/180 in FIG. 1, respectively. At 706, the base station 704 may transmit to the UE 702, and the UE 702 may receive from the base station 704, an indication of a plurality of PUCCH resources. The plurality of PUCCH resources may be, for example, multi-DL-SPS-AN PUCCH resources. In one aspect, the plurality of PUCCH resources may include four PUCCH resources.

At 708, the UE 702 may identify the plurality of PUCCH resources based on the indication received at 706.

At 710, the base station 704 may transmit to the UE 702, and the UE 702 may receive from the base station 704, an ordered symbol offset set. The ordered symbol offset set may be transmitted or configured with RRC signaling or with a media access control (MAC)-control element (CE) (MAC-CE), or may be dynamically provided in DCI. In one aspect, the ordered symbol offset set may initially be configured with RRC signaling, and then may be dynamically updated with the MAC-CE. The use of the ordered symbol offset set may be explained in further detail below.

At 712, the base station 704 may transmit to the UE 702, and the UE 702 may receive from the base station 704, one or more PDSCHs (e.g., according to one or more SPSs).

In one aspect, at 714, the UE 702 may detect a PUCCH transmission collision associated with one or more HARQ-ACK reports associated with the PDSCHs received at 712. A PUCCH transmission collision may occur in a TDD configuration when, for example, a slot configured for the PUCCH resource is a downlink slot.

Alternatively, at 716, the base station 704 may detect a PUCCH transmission collision associated with one or more HARQ-ACK reports associated with the PDSCHs received at 712, and may transmit an indication of the PUCCH transmission collision to the UE 702 at 718. Accordingly, the UE may receive the indication of the PUCCH transmission collision from the base station 704 at 718. In either case, the UE may become aware of the PUCCH transmission collision.

At 720, the UE 720 may determine the payload threshold. The payload threshold (e.g., the payload size) may be a number of bits to be included in the combined HARQ-ACK report that may be generated by multiplexing the deferred and accumulated HARQ-ACK reports up to the uplink slot in question. For example, in FIG. 6, the payload threshold for the fourth slot may be the number of bits to be included in the combined HARQ-ACK report to be transmitted in this slot. The combined HARQ-ACK report to be transmitted in the fourth slot may be generated by multiplexing the deferred and accumulated HARQ-ACK reports that correspond to the PDSCHs 615a, 615b, 615c (i.e., the PDSCHs transmitted in the first, the second, and the third slots).

The plurality of PUCCH resources indicated at 706 may be classified into first PUCCH resources, second PUCCH resource, and third PUCCH resources. There may be zero, one, or more first, second, or third PUCCH resources. The payload capacity of a first PUCCH resources may be equal to the payload threshold (e.g., the payload size). The payload capacity of a second PUCCH resources may be greater than the payload threshold (e.g., the payload size). The payload capacity of a third PUCCH resources may be less than the payload threshold (e.g., the payload size).

For example, if the UE 702 has accumulated 4 bits worth of HARQ-ACK information (i.e., the payload threshold/size may be 4 bits), and four PUCCH resources indicated at 706 PR0, PR1, PR2, and PR3 support 2 bits, 4 bits, 10 bits, and 15 bits, respectively (i.e., the payload capacities of PR0, PR1, PR2, and PR3 are 2 bits, 4 bits, 10 bits, and 15 bits, respectively), PR1 may be a first PUCCH resource (because its payload capacity is equal to the payload threshold/size); PR2 and PR3 may be second PUCCH resources (because their respective payload capacity is greater than the payload threshold/size); and PR0 may be a third PUCCH resource (because its payload capacity is less than the payload threshold/size).

At 722, the UE 702 may determine whether one or more first PUCCH resources, one or more second PUCCH resources, or one or more third PUCCH resources of a plurality of PUCCH resources are suitable for at least one uplink transmission. A PUCCH resource may be suitable for the uplink transmission if the symbol pattern (e.g., uplink, downlink, or flexible) of the slot in question is compatible with the PUCCH resource. For example, if a PUCCH resource is configured to have symbol 7 as the starting symbol and include four symbols, and the symbols 7-10 of the slot in question are configured as uplink symbols (i.e., a UUUU configuration for symbols 7-10), then the PUCCH resource may be suitable for the uplink transmission. On the other hand, if any of the symbols 7-10 of the slot in question are not configured as an uplink symbol (e.g., as a downlink symbol or as a flexible symbol instead), the symbol pattern may be incompatible with the PUCCH resource, and the PUCCH resource may not be suitable for the uplink transmission.

Among the first, the second, and the third PUCCH resources, the UE 702 may first attempt, at 722a, to select at least one first PUCCH resource to transmit the combined HARQ-ACK report. The selected at least one first PUCCH resource may be suitable for the uplink transmission for the combined HARQ-ACK report.

If none of the first PUCCH resources is suitable for the uplink transmission, at 722b, the UE 702 may then attempt to select at least one second PUCCH resource to transmit the combined HARQ-ACK report. The selected at least one second PUCCH resource may be suitable for the uplink transmission for the combined HARQ-ACK report. When there is more than one second PUCCH resource, the UE 702 may attempt the selection in an order based on the difference between the payload capacity of the second PUCCH resource and the payload threshold/size (from small to large). For example, in the example above with two second PUCCH resources PR2 and PR3, the UE 702 may attempt to select PR2 first, before attempting to select PR3 in the event PR2 may not be suitable for the uplink transmission, as the difference between the payload capacity and the payload threshold/size is 6 bits for PR2,which is smaller than the difference of 11 bits for PR3.

If none of the first or the second PUCCH resources is suitable for the uplink transmission, at 722c, the UE 702 may then attempt to select at least one third PUCCH resource to transmit the combined HARQ-ACK report. The selected at least one third PUCCH resource may be suitable for the uplink transmission for the combined HARQ-ACK report. When there is more than one third PUCCH resource, the UE 702 may attempt the selection in an order based on the difference between the payload capacity of the third PUCCH resource and the payload threshold/size (from small to large). More than one third PUCCH resource may be selected because a single third PUCCH resource may not be able to accommodate all the information from the deferred and accumulated HARQ-ACK reports.

Based on the selection, at 724, the UE 702 may transmit to the base station 704, and the base station 704 may receive from the UE 702, the uplink transmission (which may include the combined HARQ-ACK report). If at least one first PUCCH resource is selected at 722a, the transmission at 724 may be via the selected at least one of the first PUCCH resources 724a. If at least one second PUCCH resource is selected at 722b, the transmission at 724 may be via the selected at least one of the second PUCCH resources 724b. Further, if at least one third PUCCH resource is selected at 722c, the transmission at 724 may be via the selected at least one of the third PUCCH resources 724c.

If none of the first, the second, or the second PUCCH resources is suitable for the uplink transmission, in one aspect, a symbol offset may be applied to all the indicated PUCCH resources including all the first, the second, and the third PUCCH resources. Applying a symbol offset to a PUCCH resource may include shifting the starting OFDM symbol of the PUCCH resource by the symbol offset and leaving intact the number of symbols included in the PUCCH resource. For example, applying a symbol offset of −1 to a PUCCH resource spanning symbols 7-10 (i.e., the PUCCH resource has a starting symbol of symbol 7, and includes four symbols) may change the location of the PUCCH resource in time such that the shifted PUCCH resource may span symbols 6-9 (i.e., the shifted PUCCH resource has a starting symbol of symbol 6=7−1, and still includes four symbols).

After applying the symbol offset, the UE 702 may attempt to select at least one of the first, the second, or the third shifted PUCCH resources by going through 722 (including 722a, 722b, 722c) again, where the UE 702 may attempt to select at least one first, second, or third shifted PUCCH resource that may be suitable for the uplink transmission. If at least one first, second, or third shifted PUCCH resource suitable for the uplink transmission is selected at 722 (722a, 722b, or 722c), based on the selection, at 724, the UE 702 may transmit to the base station 704, and the base station 704 may receive from the UE 702, the uplink transmission (which may include the combined HARQ-ACK report) via at least one of the first, the second, or the third shifted PUCCH resources 724a, 724b, or 724c.

The symbol offset may be obtained from the ordered symbol offset set received at 710. The ordered symbol offset set may include a plurality of symbol offsets arranged in a particular order. The UE 702 may apply the symbol offsets in the symbol offset set sequentially, one at a time, in the specified order. With each symbol offset, the UE 702 may attempt to select at least one first, second, or third shifted PUCCH resource that may be suitable for the uplink transmission, in the same order as described above at 722 (722a, 722b, 722c). The UE 702 may proceed to the next symbol offset in the ordered symbol offset set when none of the first, the second, or the third PUCCH resources shifted based on the last symbol offset is suitable for the uplink transmission.

Figure 8:
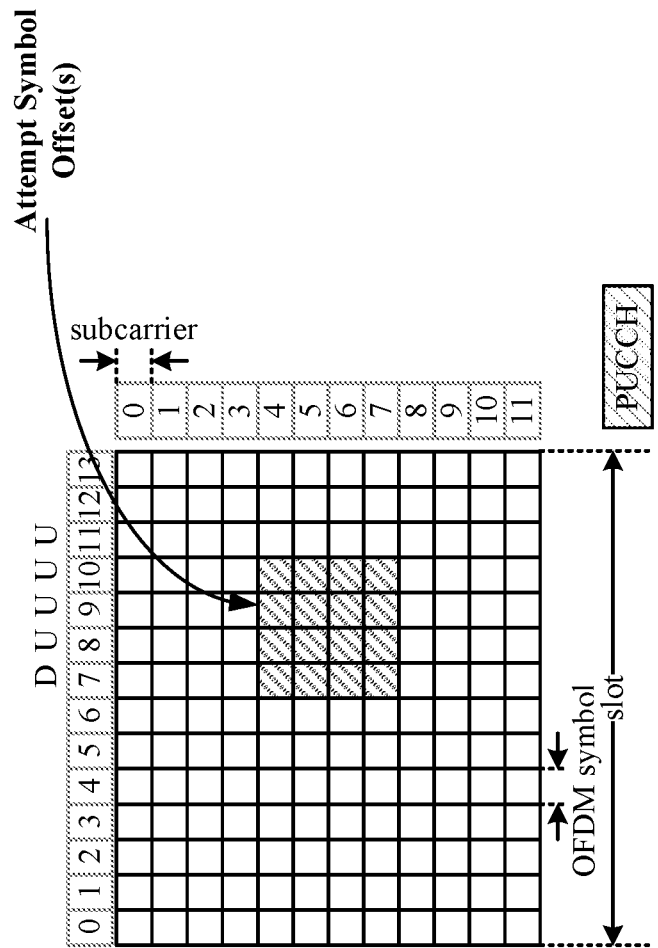
FIG. 8 is a diagram illustrating the application of symbol offsets according to aspects.

FIG. 8 is a diagram 800 illustrating the application of symbol offsets according to aspects. The PUCCH resource may have a starting symbol of symbol 7, and may span four symbols (i.e., symbols 7-10). Without applying any symbol offset, the PUCCH resource may not be suitable for the uplink transmission because symbols 7-10 of this slot is configured as DUUU, and accordingly, there may be an incompatibility at symbol 7. Assuming the base station 704 indicates a single PUCCH resource at 706, and the ordered symbol offset set transmitted at 710 is {−1, −2, −3, 1, 2, 3}, the UE 702 may apply the symbol offsets in the ordered symbol offset set in the specified order, one at a time, to look for and select a shifted PUCCH resource suitable for the uplink transmission. Due to the same incompatibility at symbol 7, which is configured as a downlink symbol, symbol offsets −1, −2, and −3 may not render the shifted PUCCH resource suitable for the uplink transmission. Subsequent to applying the symbol offset of −3 without being able to select a shifted PUCCH resource, the UE 702 may proceed to the symbol offset of 1. Applying the symbol offset of 1 may render the shifted PUCCH resource suitable for the uplink transmission, because the shifted PUCCH resource where the symbol offset is 1 may span symbols 8-11, which as shown are configured as UUUU and therefore may be compatible with the shifted PUCCH resource. Accordingly, the UE 702 may select the shifted PUCCH resource with the symbol offset 1.

Referring back to FIG. 7, at 710, the base station 704 may transmit the ordered symbol offset set in a number of ways. In one aspect, the base station 704 may transmit the ordered symbol offset set explicitly. For example, the ordered symbol offset set transmitted may be {-1, -2, -3, 1, 2, 3}, {-1, -3, 1, 3}, or {2, 3, -1, -5}, etc., in different examples. In another aspect, the base station 704 may transmit the ordered symbol offset by transmitting a symbol offset sweep range (i.e., a minimum symbol offset and a maximum symbol offset), a sweep direction (i.e., from the minimum to the maximum, or from the maximum to the minimum), and a step size (r). For example, the base station 704 may transmit a symbol offset sweep range of -4 to 5, a sweep direction of minimum to maximum, and a step size of 3. This is equivalent to explicitly transmitting the ordered set {-4, -1, 2, 5}.

If none of the first, the second, or the third (shifted) PUCCH resources is suitable for the uplink transmission, either with or without the application of symbol offsets, at 726, the UE 702 may select none of the first, the second, or the third PUCCH resources.

If none of the first, the second, or the third PUCCH resources is selected, in one aspect, at 728, the UE 702 may transmit to the base station 704, and the base station 704 may receive from the UE 702, the uplink transmission (which may include the combined HARQ-ACK report) via one or more demodulation reference signal (DMRS)-less (i.e., the UE 702 may refrain from transmitting the corresponding DMRS) non-coherent sequence-based transmissions across available uplink symbols in one or more locations indicated by one or more of the plurality of PUCCH resources. The technique may not be used if there is no available uplink symbol in the locations indicated by the plurality of PUCCH resources. Examples of the sequence-based transmissions may include discrete Fourier transform (DFT) sequences, a golden code, Reed-Solomon sequences, etc. The sequence used may be selected based on the underlying information bits (e.g., for the HARQ-ACK report) to be transmitted.

If none of the first, the second, or the third PUCCH resources is selected, in another aspect, the UE 702 may further defer the HARQ-ACK reports to the next available slot with the same number of uplink OFDM symbols. The combined HARQ-ACK report may be deferred until a slot with the same number of OFDM symbols within the uplink limits can be found. However, disadvantageously a severe delay between the PDSCH and the corresponding HARQ-ACK report may be possible.

Figure 9:
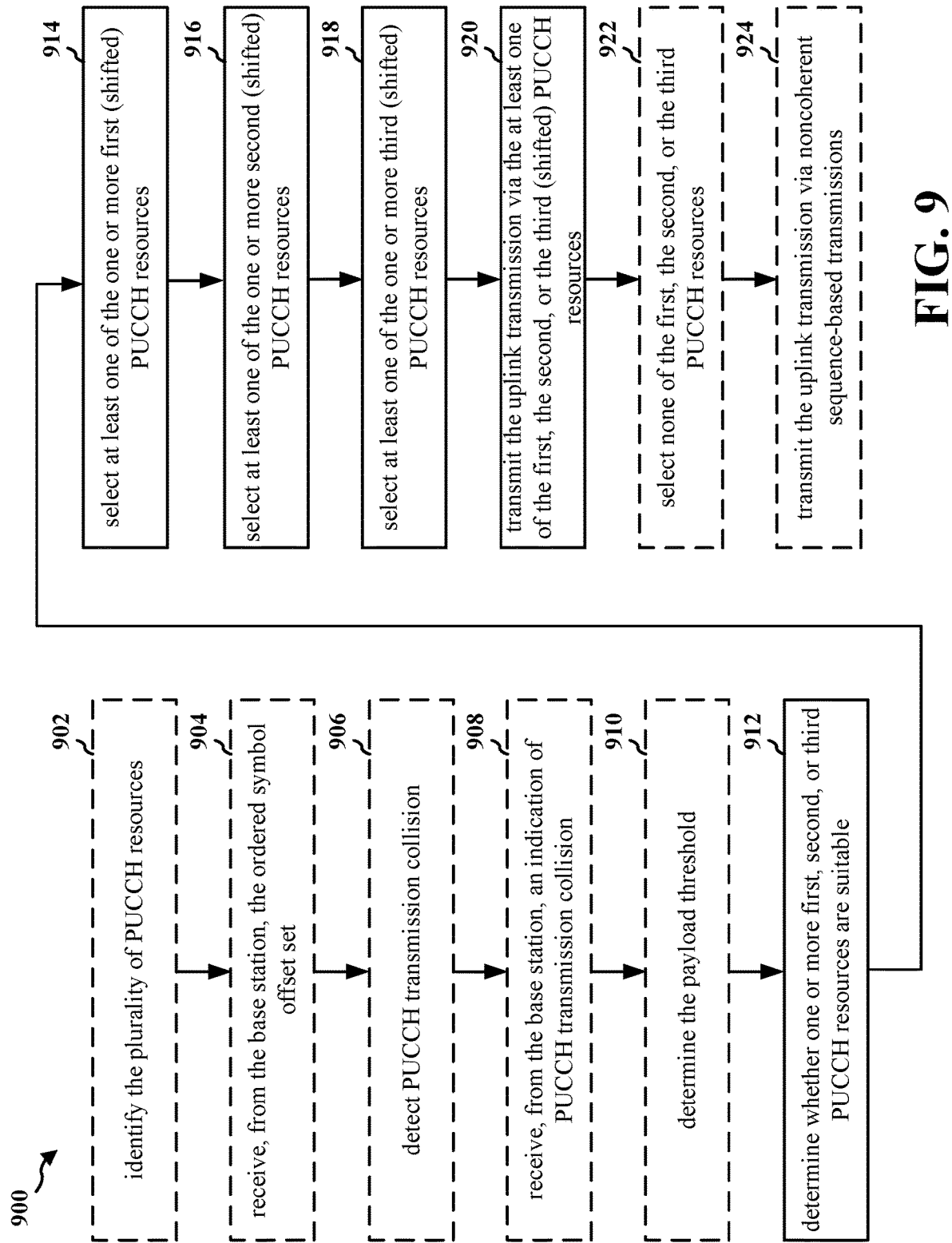
FIG. 9 is a flowchart of a method of wireless communication.

FIG. 9 is a flowchart 900 of a method of wireless communication. The method may be performed by a UE (e.g., the UE 104/702; the apparatus 1102). At 912, the UE may determine whether one or more first PUCCH resources, one or more second PUCCH resources, or one or more third PUCCH resources of a plurality of PUCCH resources are suitable for at least one uplink transmission. Each of the one or more first PUCCH resources may include a payload capacity equal to a payload threshold. Each of the one or more second PUCCH resources may include a payload capacity greater than the payload threshold. Each of the one or more third PUCCH resources may include a payload capacity less than the payload threshold. For example, 912 may be performed by the deferred HARQ-ACK component 1140 of FIG. 11. For example, referring to FIG. 7, the UE 702 may, at 722, determine whether one or more first PUCCH resources, one or more second PUCCH resources, or one or more third PUCCH resources of a plurality of PUCCH resources are suitable for at least one uplink transmission.

At 914, the UE may select, upon determining that the one or more first PUCCH resources are suitable for the at least one uplink transmission, at least one of the one or more first PUCCH resources for the at least one uplink transmission. For example, 914 may be performed by the deferred HARQ-ACK component 1140 of FIG. 11. For example, referring to FIG. 7, the UE 702 may, at 722a, select, upon determining that the one or more first PUCCH resources are suitable for the at least one uplink transmission, at least one of the one or more first PUCCH resources for the at least one uplink transmission.

At 916, the UE may select, upon determining that the one or more first PUCCH resources are not suitable and the one or more second PUCCH resources are suitable for the at least one uplink transmission, at least one of the one or more second PUCCH resources for the at least one uplink transmissions. For example, 916 may be performed by the deferred HARQ-ACK component 1140 of FIG. 11. For example, referring to FIG. 7, the UE 702 may, at 722b, select, upon determining that the one or more first PUCCH resources are not suitable and the one or more second PUCCH resources are suitable for the at least one uplink transmission, at least one of the one or more second PUCCH resources for the at least one uplink transmissions.

At 918, the UE may select, upon determining that the one or more first PUCCH resources and the one or more second PUCCH resources are not suitable and the one or more third PUCCH resources are suitable for the at least one uplink transmission, at least one of the one or more third PUCCH resources for the at least one uplink transmission. For example, 918 may be performed by the deferred HARQ-ACK component 1140 of FIG. 11. For example, referring to FIG. 7, the UE 702 may, at 722c, select, upon determining that the one or more first PUCCH resources and the one or more second PUCCH resources are not suitable and the one or more third PUCCH resources are suitable for the at least one uplink transmission, at least one of the one or more third PUCCH resources for the at least one uplink transmission.

At 920, the UE may transmit, based on the selection of PUCCH resources, the at least one uplink transmission via the selected at least one of the one or more first PUCCH resources, the one or more second PUCCH resources, or the one or more third PUCCH resources. For example, 920 may be performed by the deferred HARQ-ACK component 1140 of FIG. 11 via the transmission component 1134. For example, referring to FIG. 7, the UE 702 may, at 724, transmit, based on the selection of PUCCH resources, the at least one uplink transmission via the selected at least one of the one or more first PUCCH resources 724a, the one or more second PUCCH resources 724b, or the one or more third PUCCH resources 724c.

In one aspect, at least one of the one or more first PUCCH resources, the one or more second PUCCH resources, or the one or more third PUCCH resources may be selected based on a PUCCH transmission collision associated with the at least one uplink transmission.

At 908, the UE may receive, from a base station, an indication of the PUCCH transmission collision associated with the at least one uplink transmission. For example, 908 may be performed by the deferred HARQ-ACK component 1140 of FIG. 11 via the reception component 1130. For example, referring to FIG. 7, the UE 702 may, at 718, receive, from a base station 704, an indication of the PUCCH transmission collision associated with the at least one uplink transmission.

At 906, the UE may detect the PUCCH transmission collision associated with the at least one uplink transmission. For example, 906 may be performed by the deferred HARQ-ACK component 1140 of FIG. 11. For example, referring to FIG. 7, the UE 702 may, at 714, detect the PUCCH transmission collision associated with the at least one uplink transmission.

At 902, the UE may identify the plurality of PUCCH resources for the at least one uplink transmission. For example, 902 may be performed by the deferred HARQ-ACK component 1140 of FIG. 11. For example, referring to FIG. 7, the UE 702 may, at 708, identify the plurality of PUCCH resources for the at least one uplink transmission.

At 910, the UE may determine the payload threshold, the payload threshold corresponding to a quantity of accumulated HARQ-ACK information bits. For example, 910 may be performed by the deferred HARQ-ACK component 1140 of FIG. 11. For example, referring to FIG. 7, the UE 702 may, at 720, determine the payload threshold.

In one aspect, the at least one uplink transmission may include at least one SPS HARQ-ACK transmission.

In one aspect, the UE may select at least one of the one or more first PUCCH resources, the one or more second PUCCH resources, or the one or more third PUCCH resources based on a symbol offset of a starting symbol for each of the one or more first PUCCH resources, the one or more second PUCCH resources, or the one or more third PUCCH resources upon determining that none of the one or more first PUCCH resources, the one or more second PUCCH resources, or the one or more third PUCCH resources is suitable for the at least one uplink transmission without any symbol offset.

In one aspect, the UE may shift the starting symbol for each of the one or more first PUCCH resources, the one or more second PUCCH resources, or the one or more third PUCCH resources by the symbol offset.

At 904, the UE may receive, from the base station, an ordered symbol offset set. For example, 904 may be performed by the deferred HARQ-ACK component 1140 of FIG. 11 via the reception component 1130. For example, referring to FIG. 7, the UE 702 may, at 710, receive, from the base station 704, an ordered symbol offset set.

In one aspect, the symbol offset may be included in the ordered symbol offset set including a plurality of symbol offsets.

In one aspect, the UE may attempt at least some of the plurality of symbol offsets individually and sequentially.

In one aspect, the UE may attempt one of the plurality of symbol offsets upon determining that none of the one or more first PUCCH resources, the one or more second PUCCH resources, or the one or more third PUCCH resources is suitable for the at least one uplink transmission when a previous one of the plurality of symbol offsets is attempted.

At 922, the UE may select none of the one or more first PUCCH resources, one or more second PUCCH resources, or one or more third PUCCH resources. For example, 922 may be performed by the deferred HARQ-ACK component 1140 of FIG. 11. For example, referring to FIG. 7, the UE 702 may, at 726, select none of the one or more first PUCCH resources, one or more second PUCCH resources, or one or more third PUCCH resources.

At 924, the UE may transmit the at least one uplink transmission with one or more non-coherent sequence-based transmissions across one or more available uplink symbols upon determining that none of the one or more first PUCCH resources, the one or more second PUCCH resources, or the one or more third PUCCH resources is suitable for the at least one uplink transmission. For example, 924 may be performed by the deferred HARQ-ACK component 1140 of FIG. 11 via the transmission component 1134. For example, referring to FIG. 7, the UE 702 may, at 728, transmit the at least one uplink transmission with one or more non-coherent sequence-based transmissions across one or more available uplink symbols.

Figure 10:
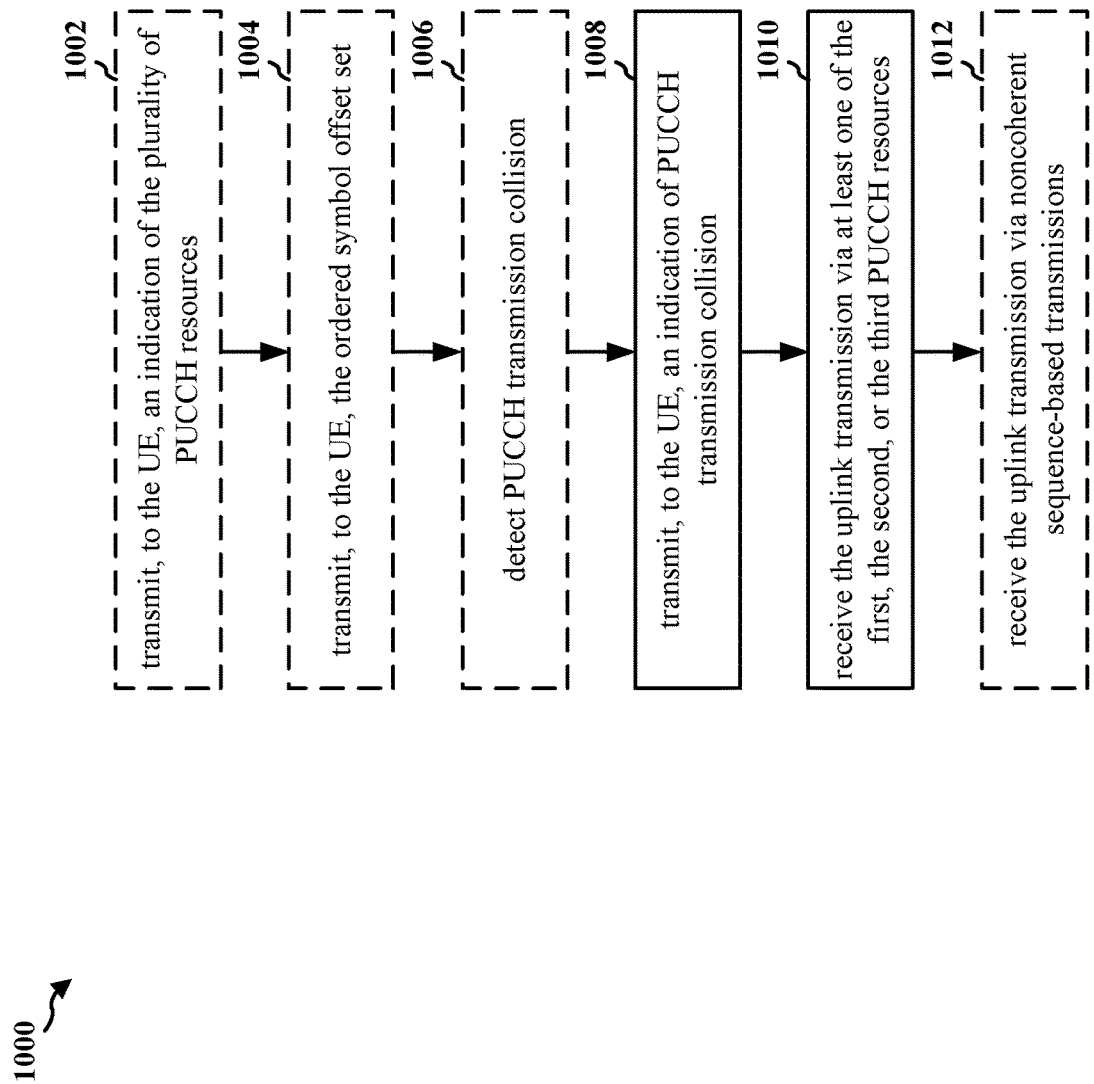
FIG. 10 is a flowchart of a method of wireless communication.

FIG. 10 is a flowchart 1000 of a method of wireless communication. The method may be performed by a base station (e.g., the base station 102/180/704; the apparatus 1202). At 1008, the base station may transmit, to a UE, an indication of a PUCCH transmission collision associated with at least one uplink transmission. For example, 1008 may be performed by the deferred HARQ-ACK component 1240 of FIG. 12 via the transmission component 1234. For example, referring to FIG. 7, the base station 704 may, at 718, transmit, to a UE 702, an indication of a PUCCH transmission collision associated with at least one uplink transmission.

At 1010, the base station may receive, from the UE, the at least one uplink transmission via at least one of one or more first PUCCH resources, one or more second PUCCH resources, or one or more third PUCCH resources of a plurality of PUCCH resources. Each of the one or more first PUCCH resources may include a payload capacity equal to a payload threshold. Each of the one or more second PUCCH resources may include a payload capacity greater than the payload threshold. Each of the one or more third PUCCH resources may include a payload capacity less than the payload threshold. The at least one uplink transmission may be received via at least one of the one or more first PUCCH resources when the one or more first PUCCH resources are suitable for the at least one uplink transmission, via at least one of the one or more second PUCCH resources when the one or more first PUCCH resources are not suitable and the one or more second PUCCH resources are suitable for the at least one uplink transmission, or via at least one of the one or more third PUCCH resources when the one or more first PUCCH resources and the one or more second PUCCH resources are not suitable and the one or more third PUCCH resources are suitable for the at least one uplink transmission. For example, 1010 may be performed by the deferred HARQ-ACK component 1240 of FIG. 12 via the reception component 1230. For example, referring to FIG. 7, the base station 704 may, at 724, receive, from the UE 702, the at least one uplink transmission via at least one of one or more first PUCCH resources 724a, one or more second PUCCH resources 724b, or one or more third PUCCH resources 724c of a plurality of PUCCH resources.

In one aspect, the at least one uplink transmission may be received via the at least one of the one or more first PUCCH resources, the one or more second PUCCH resources, or the one or more third PUCCH resources based on the PUCCH transmission collision associated with the at least one uplink transmission.

At 1006, the base station may detect the PUCCH transmission collision associated with the at least one uplink transmission. For example, 1006 may be performed by the deferred HARQ-ACK component 1240 of FIG. 12. For example, referring to FIG. 7, the base station 704 may, at 716, detect the PUCCH transmission collision associated with the at least one uplink transmission.

At 1002, the base station may indicate, to the UE, the plurality of PUCCH resources for the at least one uplink transmission. For example, 1002 may be performed by the deferred HARQ-ACK component 1240 of FIG. 12 via the transmission component 1234. For example, referring to FIG. 7, the base station 704 may, at 706, indicate, to the UE 702, the plurality of PUCCH resources for the at least one uplink transmission.

In one aspect, the payload threshold may correspond to a quantity of accumulated HARQ-ACK information bits.

In one aspect, the at least one uplink transmission may include at least one SPS HARQ-ACK transmission.

In one aspect, the at least one of the one or more first PUCCH resources, the one or more second PUCCH resources, or the one or more third PUCCH resources may be based on a symbol offset of a starting symbol for each of the one or more first PUCCH resources, the one or more second PUCCH resources, or the one or more third PUCCH resources when none of the one or more first PUCCH resources, the one or more second PUCCH resources, or the one or more third PUCCH resources is suitable for the at least one uplink transmission without any symbol offset.

In one aspect, the starting symbol for each of the one or more first PUCCH resources, the one or more second PUCCH resources, or the one or more third PUCCH resources may be shifted by the symbol offset.

At 1004, the base station may transmit, to the UE, an ordered symbol offset set. For example, 1004 may be performed by the deferred HARQ-ACK component 1240 of FIG. 12 via the transmission component 1234. For example, referring to FIG. 7, the base station 704 may, at 710, transmit, to the UE 702, an ordered symbol offset set.

In one aspect, the symbol offset may be included in the ordered symbol offset set including a plurality of symbol offsets.

In one aspect, at least some of the plurality of symbol offsets may be individually and sequentially attempted.

In one aspect, one of the plurality of symbol offsets may be attempted when none of the one or more first PUCCH resources, the one or more second PUCCH resources, or the one or more third PUCCH resources is suitable for the at least one uplink transmission when a previous one of the plurality of symbol offsets is attempted.

At 1012, the base station may receive the at least one uplink transmission via one or more non-coherent sequence-based transmissions across one or more available uplink symbols when none of the one or more first PUCCH resources, the one or more second PUCCH resources, or the one or more third PUCCH resources is suitable for the at least one uplink transmission. For example, 1012 may be performed by the deferred HARQ-ACK component 1240 of FIG. 12 via the reception component 1230. For example, referring to FIG. 7, the base station 704 may, at 728, receive the at least one uplink transmission via one or more non-coherent sequence-based transmissions across one or more available uplink symbols.

Figure 11:
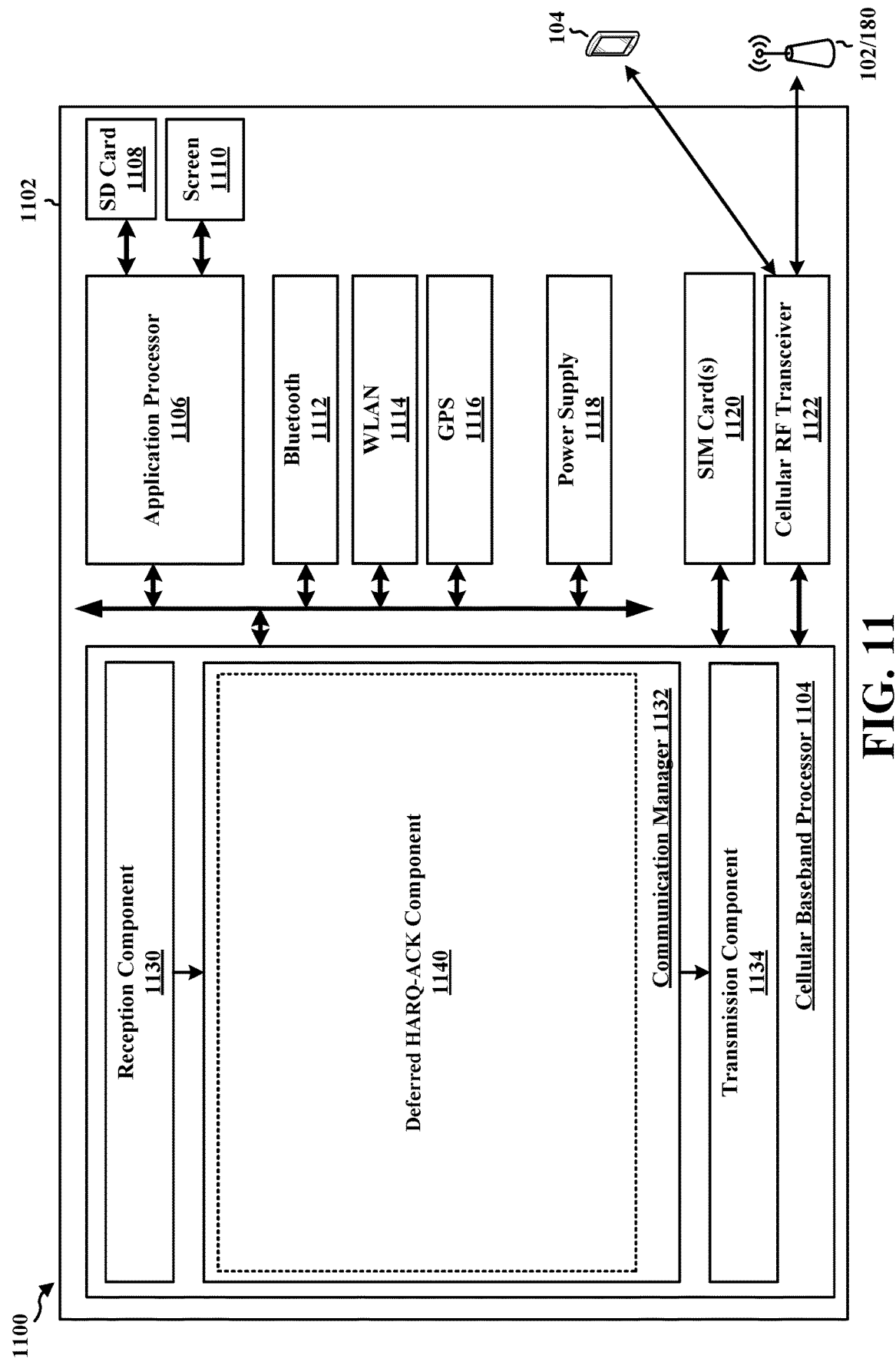
FIG. 11 is a diagram illustrating an example of a hardware implementation for an example apparatus.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the aforediscussed additional modules of the apparatus 1102.

The communication manager 1132 includes a deferred HARQ-ACK component 1140 that may be configured to determine whether one or more first PUCCH resources, one or more second PUCCH resources, or one or more third PUCCH resources of a plurality of PUCCH resources are suitable for at least one uplink transmission, e.g., as described in connection with 912 in FIG. 9. Each of the one or more first PUCCH resources may include a payload capacity equal to a payload threshold. Each of the one or more second PUCCH resources may include a payload capacity greater than the payload threshold. Each of the one or more third PUCCH resources may include a payload capacity less than the payload threshold. The deferred HARQ-ACK component 1140 may be configured to select, upon determining that the one or more first PUCCH resources are suitable for the at least one uplink transmission, at least one of the one or more first PUCCH resources for the at least one uplink transmission, e.g., as described in connection with 914 in FIG. 9. The deferred HARQ-ACK component 1140 may be configured to select, upon determining that the one or more first PUCCH resources are not suitable and the one or more second PUCCH resources are suitable for the at least one uplink transmission, at least one of the one or more second PUCCH resources for the at least one uplink transmissions, e.g., as described in connection with 916 in FIG. 9. The deferred HARQ-ACK component 1140 may be configured to select, upon determining that the one or more first PUCCH resources and the one or more second PUCCH resources are not suitable and the one or more third PUCCH resources are suitable for the at least one uplink transmission, at least one of the one or more third PUCCH resources for the at least one uplink transmission, e.g., as described in connection with 918 in FIG. 9. The deferred HARQ-ACK component 1140 may be configured to transmit, based on the selection of PUCCH resources, the at least one uplink transmission via the selected at least one of the one or more first PUCCH resources, the one or more second PUCCH resources, or the one or more third PUCCH resources, e.g., as described in connection with 920 in FIG. 9.

The apparatus may include additional components that perform each of the blocks of the algorithm in the aforementioned flowcharts of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for determining whether one or more first PUCCH resources, one or more second PUCCH resources, or one or more third PUCCH resources of a plurality of PUCCH resources are suitable for at least one uplink transmission. Each of the one or more first PUCCH resources may include a payload capacity equal to a payload threshold. Each of the one or more second PUCCH resources may include a payload capacity greater than the payload threshold. Each of the one or more third PUCCH resources may include a payload capacity less than the payload threshold. The apparatus 1102 may further include means for selecting, upon determining that the one or more first PUCCH resources are suitable for the at least one uplink transmission, at least one of the one or more first PUCCH resources for the at least one uplink transmission. The apparatus 1102 may further include means for selecting, upon determining that the one or more first PUCCH resources are not suitable and the one or more second PUCCH resources are suitable for the at least one uplink transmission, at least one of the one or more second PUCCH resources for the at least one uplink transmissions. The apparatus 1102 may further include means for selecting, upon determining that the one or more first PUCCH resources and the one or more second PUCCH resources are not suitable and the one or more third PUCCH resources are suitable for the at least one uplink transmission, at least one of the one or more third PUCCH resources for the at least one uplink transmission. The apparatus 1102 may further include means for transmitting, based on the selection of PUCCH resources, the at least one uplink transmission via the selected at least one of the one or more first PUCCH resources, the one or more second PUCCH resources, or the one or more third PUCCH resources.

In one configuration, the at least one of the one or more first PUCCH resources, the one or more second PUCCH resources, or the one or more third PUCCH resources may be selected based on a PUCCH transmission collision associated with the at least one uplink transmission. In one configuration, an indication of the PUCCH transmission collision associated with the at least one uplink transmission may be received from a base station. In one configuration, the PUCCH transmission collision associated with the at least one uplink transmission may be detected at the UE. In one configuration, the apparatus 1102 may further include means for identifying the plurality of PUCCH resources for the at least one uplink transmission. In one configuration, the apparatus 1102 may further include means for determining the payload threshold, the payload threshold corresponding to a quantity of accumulated HARQ-ACK information bits. In one configuration, the at least one uplink transmission may include at least one SPS HARQ-ACK transmission. In one configuration, the at least one of the one or more first PUCCH resources, the one or more second PUCCH resources, or the one or more third PUCCH resources may be selected based on a symbol offset of a starting symbol for each of the one or more first PUCCH resources, the one or more second PUCCH resources, or the one or more third PUCCH resources upon determining that none of the one or more first PUCCH resources, the one or more second PUCCH resources, or the one or more third PUCCH resources is suitable for the at least one uplink transmission without any symbol offset. In one configuration, the starting symbol for each of the one or more first PUCCH resources, the one or more second PUCCH resources, or the one or more third PUCCH resources may be shifted by the symbol offset. In one configuration, the symbol offset may be included in an ordered symbol offset set including a plurality of symbol offsets, the ordered symbol offset set being received from a base station. In one configuration, at least some of the plurality of symbol offsets may be individually and sequentially attempted. In one configuration, one of the plurality of symbol offsets may be attempted upon determining that none of the one or more first PUCCH resources, the one or more second PUCCH resources, or the one or more third PUCCH resources is suitable for the at least one uplink transmission when a previous one of the plurality of symbol offsets is attempted. In one configuration, the apparatus 1102 may further include means for transmitting the at least one uplink transmission with one or more non-coherent sequence-based transmissions across one or more available uplink symbols upon determining that none of the one or more first PUCCH resources, the one or more second PUCCH resources, or the one or more third PUCCH resources is suitable for the at least one uplink transmission.

The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
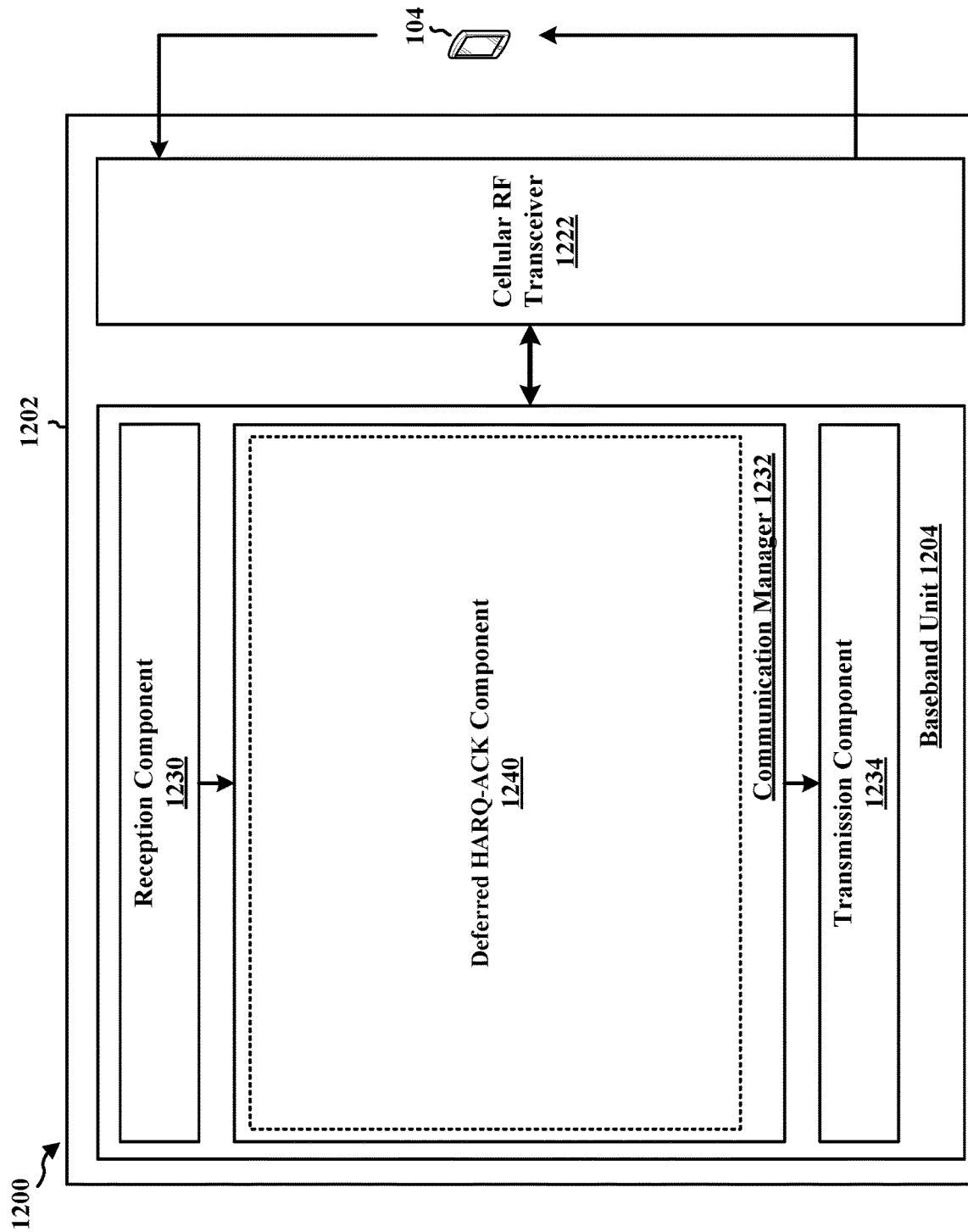
FIG. 12 is a diagram illustrating an example of a hardware implementation for an example apparatus.

FIG. 12 is a diagram 1200 illustrating an example of a hardware implementation for an apparatus 1202. The apparatus 1202 is a BS and includes a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the BS 310 and may include the memory 376 and/or at least one of the TX processor 316, the RX processor 370, and the controller/processor 375.

The communication manager 1232 includes a deferred HARQ-ACK component 1240 that that may be configured to transmit, to a UE, an indication of a PUCCH transmission collision associated with at least one uplink transmission e.g., as described in connection with 1008 in FIG. 10. The deferred HARQ-ACK component 1240 may be configured to receive, from the UE, the at least one uplink transmission via at least one of one or more first PUCCH resources, one or more second PUCCH resources, or one or more third PUCCH resources of a plurality of PUCCH resources, e.g., as described in connection with 1010 in FIG. 10. Each of the one or more first PUCCH resources may include a payload capacity equal to a payload threshold. Each of the one or more second PUCCH resources may include a payload capacity greater than the payload threshold. Each of the one or more third PUCCH resources may include a payload capacity less than the payload threshold. The at least one uplink transmission may be received via at least one of the one or more first PUCCH resources when the one or more first PUCCH resources are suitable for the at least one uplink transmission, via at least one of the one or more second PUCCH resources when the one or more first PUCCH resources are not suitable and the one or more second PUCCH resources are suitable for the at least one uplink transmission, or via at least one of the one or more third PUCCH resources when the one or more first PUCCH resources and the one or more second PUCCH resources are not suitable and the one or more third PUCCH resources are suitable for the at least one uplink transmission.

The apparatus may include additional components that perform each of the blocks of the algorithm in the aforementioned flowcharts of FIG. 10. As such, each block in the aforementioned flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for transmitting, to a UE, an indication of a PUCCH transmission collision associated with at least one uplink transmission. The apparatus 1202 may further include means for receiving, from the UE, the at least one uplink transmission via at least one of one or more first PUCCH resources, one or more second PUCCH resources, or one or more third PUCCH resources of a plurality of PUCCH resources. Each of the one or more first PUCCH resources may include a payload capacity equal to a payload threshold. Each of the one or more second PUCCH resources may include a payload capacity greater than the payload threshold. Each of the one or more third PUCCH resources may include a payload capacity less than the payload threshold. The at least one uplink transmission may be received via at least one of the one or more first PUCCH resources when the one or more first PUCCH resources are suitable for the at least one uplink transmission, via at least one of the one or more second PUCCH resources when the one or more first PUCCH resources are not suitable and the one or more second PUCCH resources are suitable for the at least one uplink transmission, or via at least one of the one or more third PUCCH resources when the one or more first PUCCH resources and the one or more second PUCCH resources are not suitable and the one or more third PUCCH resources are suitable for the at least one uplink transmission.

In one configuration, the at least one uplink transmission may be received via the at least one of the one or more first PUCCH resources, the one or more second PUCCH resources, or the one or more third PUCCH resources based on the PUCCH transmission collision associated with the at least one uplink transmission. In one configuration, the PUCCH transmission collision associated with the at least one uplink transmission may be detected at the base station. The apparatus 1202 may further include means for indicating, to the UE, the plurality of PUCCH resources for the at least one uplink transmission. In one configuration, the payload threshold may correspond to a quantity of accumulated HARQ-ACK information bits. In one configuration, the at least one uplink transmission may include at least one SPS HARQ-ACK transmission. In one configuration, the at least one of the one or more first PUCCH resources, the one or more second PUCCH resources, or the one or more third PUCCH resources may be based on a symbol offset of a starting symbol for each of the one or more first PUCCH resources, the one or more second PUCCH resources, or the one or more third PUCCH resources when none of the one or more first PUCCH resources, the one or more second PUCCH resources, or the one or more third PUCCH resources is suitable for the at least one uplink transmission without any symbol offset. In one configuration, the starting symbol for each of the one or more first PUCCH resources, the one or more second PUCCH resources, or the one or more third PUCCH resources may be shifted by the symbol offset. In one configuration, the symbol offset may be included in an ordered symbol offset set including a plurality of symbol offsets, the ordered symbol offset set being transmitted to the UE. In one configuration, at least some of the plurality of symbol offsets may be individually and sequentially attempted. In one configuration, one of the plurality of symbol offsets may be attempted when none of the one or more first PUCCH resources, the one or more second PUCCH resources, or the one or more third PUCCH resources is suitable for the at least one uplink transmission when a previous one of the plurality of symbol offsets is attempted. The apparatus 1202 may further include means for receiving the at least one uplink transmission via one or more non-coherent sequence-based transmissions across one or more available uplink symbols when none of the one or more first PUCCH resources, the one or more second PUCCH resources, or the one or more third PUCCH resources is suitable for the at least one uplink transmission.

The aforementioned means may be one or more of the aforementioned components of the apparatus 1202 configured to perform the functions recited by the aforementioned means. As described supra, the apparatus 1202 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Aspects relate to techniques for finding the first available uplink slot for the transmission of a combined HARQ-ACK report in a TDD configuration, which may not be straightforward when the uplink symbols may not match the configured PUCCH resources. In one aspect, the configured PUCCH resources may be shifted in the time domain so that one or more PUCCHs carrying the combined HARQ-ACK report may be transmitted given a symbol pattern in the slot. Accordingly, a severe delay between PDSCHs and the corresponding combined HARQ-ACK report may be avoided.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a UE, including: determining whether one or more first PUCCH resources, one or more second PUCCH resources, or one or more third PUCCH resources of a plurality of PUCCH resources are suitable for at least one uplink transmission, each of the one or more first PUCCH resources including a payload capacity equal to a payload threshold, each of the one or more second PUCCH resources including a payload capacity greater than the payload threshold, each of the one or more third PUCCH resources including a payload capacity less than the payload threshold; selecting, upon determining that the one or more first PUCCH resources are suitable for the at least one uplink transmission, at least one of the one or more first PUCCH resources for the at least one uplink transmission; selecting, upon determining that the one or more first PUCCH resources are not suitable and the one or more second PUCCH resources are suitable for the at least one uplink transmission, at least one of the one or more second PUCCH resources for the at least one uplink transmissions; selecting, upon determining that the one or more first PUCCH resources and the one or more second PUCCH resources are not suitable and the one or more third PUCCH resources are suitable for the at least one uplink transmission, at least one of the one or more third PUCCH resources for the at least one uplink transmission; and transmitting, based on the selection of PUCCH resources, the at least one uplink transmission via the selected at least one of the one or more first PUCCH resources, the one or more second PUCCH resources, or the one or more third PUCCH resources.

Aspect 2 is the method of aspect 1, where the at least one of the one or more first PUCCH resources, the one or more second PUCCH resources, or the one or more third PUCCH resources is selected based on a PUCCH transmission collision associated with the at least one uplink transmission.

Aspect 3 is the method of aspect 2, where an indication of the PUCCH transmission collision associated with the at least one uplink transmission is received from a base station.

Aspect 4 is the method of aspect 2, where the PUCCH transmission collision associated with the at least one uplink transmission is detected at the UE.

Aspect 5 is the method of any of aspects 1 to 4, further including: identifying the plurality of PUCCH resources for the at least one uplink transmission.

Aspect 6 is the method of any of aspects 1 to 5, further including: determining the payload threshold, the payload threshold corresponding to a quantity of accumulated HARQ-ACK information bits.

Aspect 7 is the method of aspect 6, where the at least one uplink transmission includes at least one SPS HARQ-ACK transmission.

Aspect 8 is the method of any of aspects 1 to 7, where the at least one of the one or more first PUCCH resources, the one or more second PUCCH resources, or the one or more third PUCCH resources is selected based on a symbol offset of a starting symbol for each of the one or more first PUCCH resources, the one or more second PUCCH resources, or the one or more third PUCCH resources upon determining that none of the one or more first PUCCH resources, the one or more second PUCCH resources, or the one or more third PUCCH resources is suitable for the at least one uplink transmission without any symbol offset.

Aspect 9 is the method of aspect 8, where the starting symbol for each of the one or more first PUCCH resources, the one or more second PUCCH resources, or the one or more third PUCCH resources is shifted by the symbol offset.

Aspect 10 is the method of aspect 9, where the symbol offset is included in an ordered symbol offset set including a plurality of symbol offsets, the ordered symbol offset set being received from a base station.

Aspect 11 is the method of aspect 10, where at least some of the plurality of symbol offsets are individually and sequentially attempted.

Aspect 12 is the method of aspect 11, where one of the plurality of symbol offsets is attempted upon determining that none of the one or more first PUCCH resources, the one or more second PUCCH resources, or the one or more third PUCCH resources is suitable for the at least one uplink transmission when a previous one of the plurality of symbol offsets is attempted.

Aspect 13 is the method of any of aspects 1 to 12, further including: transmitting the at least one uplink transmission with one or more non-coherent sequence-based transmissions across one or more available uplink symbols upon determining that none of the one or more first PUCCH resources, the one or more second PUCCH resources, or the one or more third PUCCH resources is suitable for the at least one uplink transmission.

Aspect 14 is an apparatus for wireless communication including at least one processor coupled to a memory and configured to implement a method as in any of aspects 1 to 13.

Aspect 15 is an apparatus for wireless communication including means for implementing a method as in any of aspects 1 to 13.

Aspect 16 is a computer-readable medium storing computer executable code, where the code when executed by a processor causes the processor to implement a method as in any of aspects 1 to 13.

Aspect 17 is a method of wireless communication of a base station, including: transmitting, to a UE, an indication of a PUCCH transmission collision associated with at least one uplink transmission; and receiving, from the UE, the at least one uplink transmission via at least one of one or more first PUCCH resources, one or more second PUCCH resources, or one or more third PUCCH resources of a plurality of PUCCH resources, each of the one or more first PUCCH resources including a payload capacity equal to a payload threshold, each of the one or more second PUCCH resources including a payload capacity greater than the payload threshold, each of the one or more third PUCCH resources including a payload capacity less than the payload threshold, where the at least one uplink transmission is received via at least one of the one or more first PUCCH resources when the one or more first PUCCH resources are suitable for the at least one uplink transmission, via at least one of the one or more second PUCCH resources when the one or more first PUCCH resources are not suitable and the one or more second PUCCH resources are suitable for the at least one uplink transmission, or via at least one of the one or more third PUCCH resources when the one or more first PUCCH resources and the one or more second PUCCH resources are not suitable and the one or more third PUCCH resources are suitable for the at least one uplink transmission.

Aspect 18 is the method of aspect 17, where the at least one uplink transmission is received via the at least one of the one or more first PUCCH resources, the one or more second PUCCH resources, or the one or more third PUCCH resources based on the PUCCH transmission collision associated with the at least one uplink transmission.

Aspect 19 is the method of aspect 18, where the PUCCH transmission collision associated with the at least one uplink transmission is detected at the base station.

Aspect 20 is the method of any of aspects 17 to 19, further including: indicating, to the UE, the plurality of PUCCH resources for the at least one uplink transmission.

Aspect 21 is the method of any of aspects 17 to 20, where the payload threshold corresponds to a quantity of accumulated HARQ-ACK information bits.

Aspect 22 is the method of aspect 21, where the at least one uplink transmission includes at least one SPS HARQ-ACK transmission.

Aspect 23 is the method of any of aspects 17 to 22, where the at least one of the one or more first PUCCH resources, the one or more second PUCCH resources, or the one or more third PUCCH resources is based on a symbol offset of a starting symbol for each of the one or more first PUCCH resources, the one or more second PUCCH resources, or the one or more third PUCCH resources when none of the one or more first PUCCH resources, the one or more second PUCCH resources, or the one or more third PUCCH resources is suitable for the at least one uplink transmission without any symbol offset.

Aspect 24 is the method of aspect 23, where the starting symbol for each of the one or more first PUCCH resources, the one or more second PUCCH resources, or the one or more third PUCCH resources is shifted by the symbol offset.

Aspect 25 is the method of aspect 24, where the symbol offset is included in an ordered symbol offset set including a plurality of symbol offsets, the ordered symbol offset set being transmitted to the UE.

Aspect 26 is the method of aspect 25, where at least some of the plurality of symbol offsets are individually and sequentially attempted.

Aspect 27 is the method of aspect 26, where one of the plurality of symbol offsets is attempted when none of the one or more first PUCCH resources, the one or more second PUCCH resources, or the one or more third PUCCH resources is suitable for the at least one uplink transmission when a previous one of the plurality of symbol offsets is attempted.

Aspect 28 is the method of any of aspects 17 to 27, further including: receiving the at least one uplink transmission via one or more non-coherent sequence-based transmissions across one or more available uplink symbols when none of the one or more first PUCCH resources, the one or more second PUCCH resources, or the one or more third PUCCH resources is suitable for the at least one uplink transmission.

Aspect 29 is an apparatus for wireless communication including at least one processor coupled to a memory and configured to implement a method as in any of aspects 17 to 28.

Aspect 30 is an apparatus for wireless communication including means for implementing a method as in any of aspects 17 to 28.

Aspect 31 is a computer-readable medium storing computer executable code, where the code when executed by a processor causes the processor to implement a method as in any of aspects 17 to 28.

What is claimed is:

1. A method of wireless communication of a user equipment (UE), comprising:
dividing a plurality of physical uplink control channel (PUCCH) resources into one or more first PUCCH resources, one or more second PUCCH resources, or one or more third PUCCH resources based on a payload threshold and a respective payload capacity associated with the one or more first PUCCH resources, the one or more second PUCCH resources, or the one or more third PUCCH resources, each of the one or more first PUCCH resources including a first payload capacity equal to the payload threshold, each of the one or more second PUCCH resources including a second payload capacity greater than the payload threshold, each of the one or more third PUCCH resources including a third payload capacity less than the payload threshold;
determining whether the one or more first PUCCH resources, the one or more second PUCCH resources, or the one or more third PUCCH resources are suitable for at least one uplink transmission;
selecting, upon determining that the one or more first PUCCH resources are suitable for the at least one uplink transmission, at least one of the one or more first PUCCH resources for the at least one uplink transmission;
selecting, upon determining that the one or more first PUCCH resources are not suitable and the one or more second PUCCH resources are suitable for the at least one uplink transmission, at least one of the one or more second PUCCH resources for the at least one uplink transmissions;
selecting, upon determining that the one or more first PUCCH resources and the one or more second PUCCH resources are not suitable and the one or more third PUCCH resources are suitable for the at least one uplink transmission, at least one of the one or more third PUCCH resources for the at least one uplink transmission; and
transmitting, based on the selection of PUCCH resources, the at least one uplink transmission via the selected at least one of the one or more first PUCCH resources, the one or more second PUCCH resources, or the one or more third PUCCH resources.

2. The method of claim 1, wherein the at least one of the one or more first PUCCH resources, the one or more second PUCCH resources, or the one or more third PUCCH resources is selected based on a PUCCH transmission collision associated with the at least one uplink transmission.

3. The method of claim 2, wherein an indication of the PUCCH transmission collision associated with the at least one uplink transmission is received from a base station.

4. The method of claim 2, wherein the PUCCH transmission collision associated with the at least one uplink transmission is detected at the UE.

5. The method of claim 1, further comprising:
identifying the plurality of PUCCH resources for the at least one uplink transmission.

6. The method of claim 1, further comprising:
determining the payload threshold, the payload threshold corresponding to a quantity of accumulated hybrid automatic repeat request (HARQ)-acknowledgment (ACK) information bits.

7. The method of claim 6, wherein the at least one uplink transmission comprises at least one semi-persistent scheduling (SPS) HARQ-ACK transmission.

8. The method of claim 1, wherein the at least one of the one or more first PUCCH resources, the one or more second PUCCH resources, or the one or more third PUCCH resources is selected based on a symbol offset of a starting symbol for each of the one or more first PUCCH resources, the one or more second PUCCH resources, or the one or more third PUCCH resources upon determining that none of the one or more first PUCCH resources, the one or more second PUCCH resources, or the one or more third PUCCH resources is suitable for the at least one uplink transmission without any symbol offset.

9. The method of claim 8, wherein the starting symbol for each of the one or more first PUCCH resources, the one or more second PUCCH resources, or the one or more third PUCCH resources is shifted by the symbol offset.

10. The method of claim 9, wherein the symbol offset is comprised in an ordered symbol offset set comprising a plurality of symbol offsets, the ordered symbol offset set being received from a base station.

11. The method of claim 10, wherein at least some of the plurality of symbol offsets are individually and sequentially attempted.

12. The method of claim 11, wherein one of the plurality of symbol offsets is attempted upon determining that none of the one or more first PUCCH resources, the one or more second PUCCH resources, or the one or more third PUCCH resources is suitable for the at least one uplink transmission when a previous one of the plurality of symbol offsets is attempted.

13. The method of claim 1, further comprising:
transmitting the at least one uplink transmission with one or more non-coherent sequence-based transmissions across one or more available uplink symbols upon determining that none of the one or more first PUCCH resources, the one or more second PUCCH resources, or the one or more third PUCCH resources is suitable for the at least one uplink transmission.

14. An apparatus for wireless communication, the apparatus being a user equipment (UE), comprising:
a memory; and
at least one processor coupled to the memory and configured to:
divide a plurality of physical uplink control channel (PUCCH) resources into one or more first PUCCH resources, one or more second PUCCH resources, or one or more third PUCCH resources based on a payload threshold and a respective payload capacity associated with the one or more first PUCCH resources, the one or more second PUCCH resources, or the one or more third PUCCH resources, each of the one or more first PUCCH resources including a first payload capacity equal to the payload threshold, each of the one or more second PUCCH resources including a second payload capacity greater than the payload threshold, each of the one or more third PUCCH resources including a third payload capacity less than the payload threshold;
determine whether the one or more first PUCCH resources, the one or more second PUCCH resources, or the one or more third PUCCH resources are suitable for at least one uplink transmission;
select, upon determining that the one or more first PUCCH resources are suitable for the at least one uplink transmission, at least one of the one or more first PUCCH resources for the at least one uplink transmission;
select, upon determining that the one or more first PUCCH resources are not suitable and the one or more second PUCCH resources are suitable for the at least one uplink transmission, at least one of the one or more second PUCCH resources for the at least one uplink transmissions;
select, upon determining that the one or more first PUCCH resources and the one or more second PUCCH resources are not suitable and the one or more third PUCCH resources are suitable for the at least one uplink transmission, at least one of the one or more third PUCCH resources for the at least one uplink transmission; and
transmit, based on the selection of PUCCH resources, the at least one uplink transmission via the selected at least one of the one or more first PUCCH resources, the one or more second PUCCH resources, or the one or more third PUCCH resources.

15. The apparatus of claim 14, wherein to select the at least one of the one or more first PUCCH resources, the one or more second PUCCH resources, or the one or more third PUCCH resources, the at least one processor is configured to select the at least one of the one or more first PUCCH resources, the one or more second PUCCH resources, or the one or more third PUCCH resources based on a PUCCH transmission collision associated with the at least one uplink transmission.

16. A method of wireless communication of a base station, comprising:
transmitting, to a user equipment (UE), an indication of a physical uplink control channel (PUCCH) transmission collision associated with at least one uplink transmission; and
receiving, from the UE, the at least one uplink transmission via at least one of one or more first PUCCH resources, one or more second PUCCH resources, or one or more third PUCCH resources of a plurality of PUCCH resources, each of the one or more first PUCCH resources including a payload capacity equal to a payload threshold, each of the one or more second PUCCH resources including a payload capacity greater than the payload threshold, each of the one or more third PUCCH resources including a payload capacity less than the payload threshold,
the at least one uplink transmission being received via at least one of the one or more first PUCCH resources when the one or more first PUCCH resources are suitable for the at least one uplink transmission, via at least one of the one or more second PUCCH resources when the one or more first PUCCH resources are not suitable and the one or more second PUCCH resources are suitable for the at least one uplink transmission, or via at least one of the one or more third PUCCH resources when the one or more first PUCCH resources and the one or more second PUCCH resources are not suitable and the one or more third PUCCH resources are suitable for the at least one uplink transmission,
wherein a current partitioning of the one or more first PUCCH resources, the one or more second PUCCH resources, or the one or more third PUCCH resources is different from an initial partitioning of PUCCH resources associated with the at least one uplink transmission.

17. The method of claim 16, wherein the at least one uplink transmission is received via the at least one of the one or more first PUCCH resources, the one or more second PUCCH resources, or the one or more third PUCCH resources based on the PUCCH transmission collision associated with the at least one uplink transmission.

18. The method of claim 17, wherein the PUCCH transmission collision associated with the at least one uplink transmission is detected at the base station.

19. The method of claim 16, further comprising:
indicating, to the UE, the plurality of PUCCH resources for the at least one uplink transmission.

20. The method of claim 16, wherein the payload threshold corresponds to a quantity of accumulated hybrid automatic repeat request (HARQ)-acknowledgment (ACK) information bits.

21. The method of claim 20, wherein the at least one uplink transmission comprises at least one semi-persistent scheduling (SPS) HARQ-ACK transmission.

22. The method of claim 16, wherein the at least one of the one or more first PUCCH resources, the one or more second PUCCH resources, or the one or more third PUCCH resources is based on a symbol offset of a starting symbol for each of the one or more first PUCCH resources, the one or more second PUCCH resources, or the one or more third PUCCH resources when none of the one or more first PUCCH resources, the one or more second PUCCH resources, or the one or more third PUCCH resources is suitable for the at least one uplink transmission without any symbol offset.

23. The method of claim 22, wherein the starting symbol for each of the one or more first PUCCH resources, the one or more second PUCCH resources, or the one or more third PUCCH resources is shifted by the symbol offset.

24. The method of claim 23, wherein the symbol offset is comprised in an ordered symbol offset set comprising a plurality of symbol offsets, the ordered symbol offset set being transmitted to the UE.

25. The method of claim 24, wherein at least some of the plurality of symbol offsets are individually and sequentially attempted.

26. The method of claim 25, wherein one of the plurality of symbol offsets is attempted when none of the one or more first PUCCH resources, the one or more second PUCCH resources, or the one or more third PUCCH resources is suitable for the at least one uplink transmission when a previous one of the plurality of symbol offsets is attempted.

27. The method of claim 16, further comprising:
receiving the at least one uplink transmission via one or more non-coherent sequence-based transmissions across one or more available uplink symbols when none of the one or more first PUCCH resources, the one or more second PUCCH resources, or the one or more third PUCCH resources is suitable for the at least one uplink transmission.

28. An apparatus for wireless communication, the apparatus being a base station, comprising:
a memory; and
at least one processor coupled to the memory and configured to:
transmit, to a user equipment (UE), an indication of a physical uplink control channel (PUCCH) transmission collision associated with at least one uplink transmission; and
receive, from the UE, the at least one uplink transmission via at least one of one or more first PUCCH resources, one or more second PUCCH resources, or one or more third PUCCH resources of a plurality of PUCCH resources, each of the one or more first PUCCH resources including a payload capacity equal to a payload threshold, each of the one or more second PUCCH resources including a payload capacity greater than the payload threshold, each of the one or more third PUCCH resources including a payload capacity less than the payload threshold,
the at least one uplink transmission being received via at least one of the one or more first PUCCH resources when the one or more first PUCCH resources are suitable for the at least one uplink transmission, via at least one of the one or more second PUCCH resources when the one or more first PUCCH resources are not suitable and the one or more second PUCCH resources are suitable for the at least one uplink transmission, or via at least one of the one or more third PUCCH resources when the one or more first PUCCH resources and the one or more second PUCCH resources are not suitable and the one or more third PUCCH resources are suitable for the at least one uplink transmission, wherein a current partitioning of the one or more first PUCCH resources, the one or more second PUCCH resources, or the one or more third PUCCH resources is different from an initial partitioning of PUCCH resources associated with the at least one uplink transmission.

29. The apparatus of claim 28, wherein to receive the at least one uplink transmission, the at least one processor is configured to receive the at least one uplink transmission via the at least one of the one or more first PUCCH resources, the one or more second PUCCH resources, or the one or more third PUCCH resources based on the PUCCH transmission collision associated with the at least one uplink transmission.

30. The apparatus of claim 29, wherein the PUCCH transmission collision associated with the at least one uplink transmission is detected at the base station.

\* \* \* \* \*